US012047350B2

United States Patent
Palanisamy et al.

(10) Patent No.: US 12,047,350 B2
(45) Date of Patent: Jul. 23, 2024

(54) CENTRALIZED REQUEST VALIDATION

(71) Applicant: PayPal, Inc., San Jose, CA (US)

(72) Inventors: Tamilselvan Palanisamy, Bangalore (IN); Prabin Patodia, Bangalore (IN)

(73) Assignee: PayPal, Inc., San Jose, CA (US)

( * ) Notice: Subject to any disclaimer, the term of this patent is extended or adjusted under 35 U.S.C. 154(b) by 658 days.

(21) Appl. No.: 16/887,464

(22) Filed: May 29, 2020

(65) Prior Publication Data

US 2021/0367919 A1 Nov. 25, 2021

(30) Foreign Application Priority Data

May 23, 2020 (IN) .............................. 202041021727

(51) Int. Cl.
*H04L 29/06* (2006.01)
*H04L 9/40* (2022.01)
*H04L 12/66* (2006.01)

(52) U.S. Cl.
CPC .......... *H04L 63/0209* (2013.01); *H04L 12/66* (2013.01)

(58) Field of Classification Search
CPC ... H04L 12/66; H04L 63/0209; H04L 67/535; G06F 9/466
See application file for complete search history.

(56) References Cited

U.S. PATENT DOCUMENTS

| 7,042,988 B2* | 5/2006 | Juitt | H04L 1/22 455/411 |
| 2003/0095540 A1* | 5/2003 | Mulligan | H04L 67/563 370/352 |
| 2013/0254335 A1* | 9/2013 | Inoue | H04L 67/51 709/217 |
| 2017/0352020 A1* | 12/2017 | Jaeger | H04W 76/25 |

(Continued)

*Primary Examiner* — Dao Q Ho
(74) *Attorney, Agent, or Firm* — Greenberg Traurig, LLP

(57) ABSTRACT

Systems and techniques that facilitate centralized request validation are provided. In various embodiments, a central validation server can comprise an input component. In various cases, the input component can receive a validation instruction from a gateway service. In various aspects, the validation instruction can be based on a request received by the gateway service from a client. In various instances, the request can be handleable by an operational flow path through a plurality of domain services that are downstream of the gateway service. In various embodiments, the central validation server can comprise a central validation specification component. In various aspects, the central validation specification component can store a plurality of request validation specifications respectively corresponding to the plurality of domain services. In various embodiments, the central validation server can comprise an output component. In various instances, the output component can transmit, in response to the validation instruction, the plurality of request validation specifications to the gateway service. In various aspects, the gateway service can validate the request based on the plurality of request validation specifications. In (Continued)

various embodiments, the gateway service can determine that the request fails to satisfy at least one of the plurality of request validation specifications. In various cases, the gateway service can return an error to the client without invoking any of the plurality of domain services.

23 Claims, 17 Drawing Sheets

(56) References Cited

U.S. PATENT DOCUMENTS

| | | | |
|---|---|---|---|
| 2020/0259667 A1* | 8/2020 | Garnier | H04L 67/12 |
| 2021/0367919 A1* | 11/2021 | Palanisamy | H04L 63/0209 |
| 2022/0321528 A1* | 10/2022 | Konda | H04L 67/568 |

* cited by examiner

CENTRALIZED REQUEST VALIDATION

CROSS-REFERENCE TO RELATED APPLICATIONS

This application claims priority to India Patent Application No. 202041021727 filed on May 23, 2020, entitled "CENTRALIZED REQUEST VALIDATION." The entirety of the aforementioned application is incorporated by reference herein.

TECHNICAL FIELD

The subject disclosure relates generally to request validation, and more specifically to centralized request validation.

BACKGROUND

Conventionally, each computerized service (e.g., gateway service or domain service) in a service-oriented system stores its own corresponding request validation specification. When a request, call, or invocation is received at the computerized service, the computerized service validates the request, call, or invocation based on its own request validation specification (e.g., the computerized service checks that the data in the request, call, or invocation satisfy the rules, characteristics, or requirements that are specified in its corresponding request validation specification). If validation is successful, the computerized service can request, call, or invoke one or more other computerized services (e.g., domain services) to handle and/or resolve the original request, call, or invocation, and these one or more other computerized services can perform their own separate validations based on their own separate request validation specifications. Such conventional systems result in late and/or lazy detection of invalid data. Moreover, such conventional systems and/or techniques implement validation schemes that are tightly coupled to the individual computerized service implementations.

Systems and/or techniques that can ameliorate one or more of these problems are desirable.

DETAILED DESCRIPTION

Figure 1:
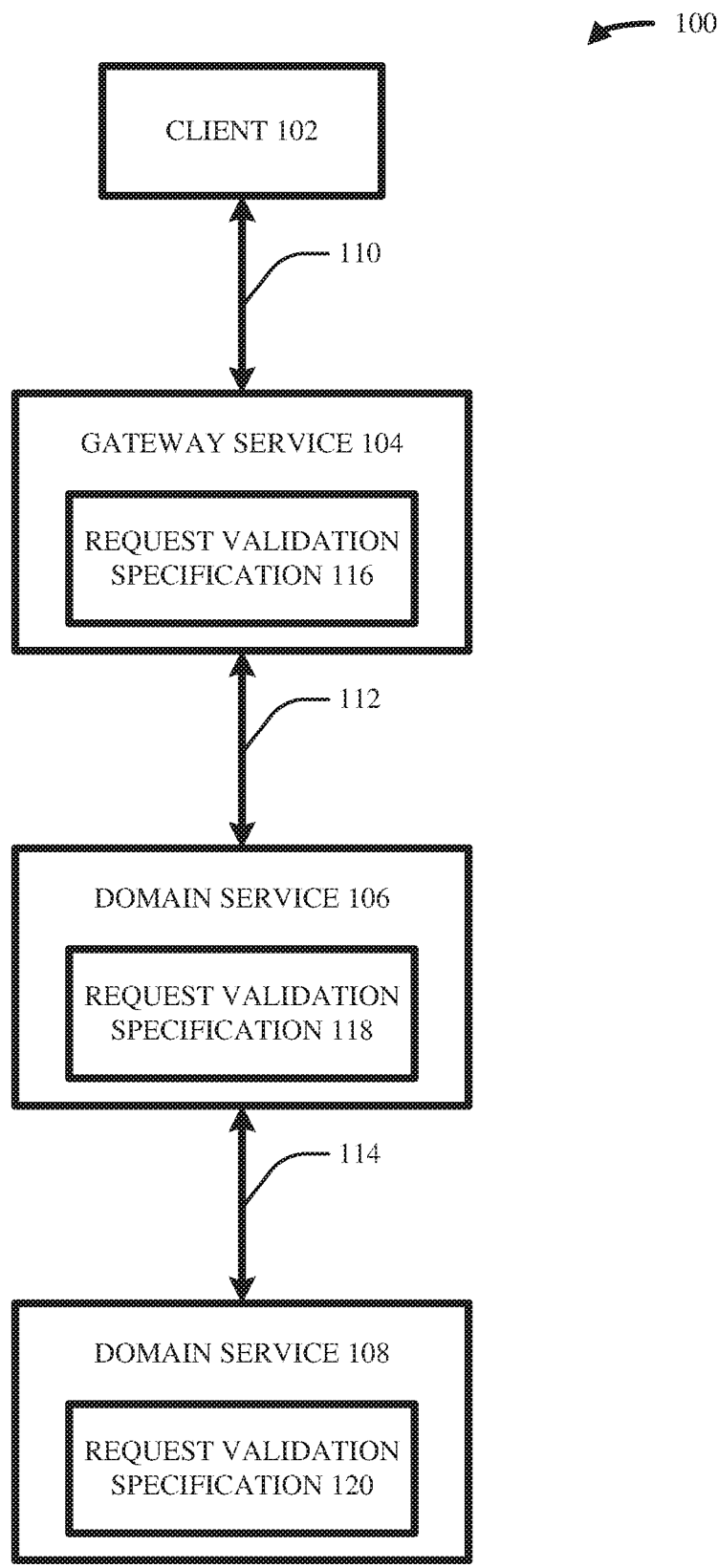
FIG. 1 illustrates a high-level block diagram of a conventional request validation system.

The following detailed description is merely illustrative and is not intended to limit embodiments and/or application or uses of embodiments. Furthermore, there is no intention to be bound by any expressed or implied information presented in the preceding Background section, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Modern computerized transaction systems often implement a service-oriented architecture. Such systems involve one or more domain services, each of which is a discrete unit of functionality that can be accessed remotely and/or which can be acted upon and/or updated independently. A domain service can have its own application programming interface (API) and can be configured to perform one or more particular computing tasks and/or operations (e.g., retrieving particular data from a particular database and/or data structure, performing a particular computation, performing a particular encryption and/or decryption, creating particular documents and/or files; distributing and/or transmitting particular data to particular audiences; cross-referencing and/or cross-checking particular data with known data). In various cases, a domain service can comprise one or more underlying domain services (e.g., microservices). That is, in some cases, a domain service can facilitate its functionality by calling and/or invoking one or more other domain services (e.g., the domain services can be nested and/or chained together). In various aspects, a computing client can have an objective to be fulfilled, and the one or more domain services can be called and/or invoked (e.g., in parallel and/or in series) to fulfill that objective.

To eliminate the need for the computing client to separately interact with each API of the one or more domain services, a gateway service can be implemented. In various instances, the gateway service can be a single, unified API with which the computing client can interact, which can call and/or invoke the one or more domain services, and/or which can consolidate results received from the one or more domain services. That is, in various aspects, the gateway service can be a single, unified place of integration and/or interaction for the computing client. For example, the gateway service can receive a request from the computing client, the gateway service can call and/or invoke one or more domain services (e.g., in series and/or in parallel) to handle and/or resolve the request (e.g., in some cases, a domain service called by the gateway service can itself call other domain services, and/or a domain service called by an upstream domain service can itself call other domain services), the gateway service can receive separate results from the one or more domain services, and the gateway service can consolidate the results into a single response for the computing client. In a non-limiting example, a request received by the gateway service can, in some cases, be handleable and/or resolvable by the gateway service calling one or more domain services in parallel (e.g., the gateway service can call a domain service A, can call a domain service B, and/or can call a domain service C in parallel and/or substantially simultaneously in order to handle and/or resolve the request). In another non-limiting example, a request received by the gateway service can be handleable and/or resolvable by the gateway service calling one or more domain services in series and/or sequentially (e.g., the gateway service can call a domain service A, can call a domain service B after calling the domain service A and/or after receiving results from the domain service A, and/or can call a domain service C after calling the domain service B and/or after receiving results from the domain service B). In yet another non-limiting example, a domain service that has been called can itself call one or more other domain services in series and/or in parallel (e.g., the gateway service can call a domain service A, can call a domain service B, and/or can call a domain service C in parallel and/or in series, then the domain service B can itself call a domain service D and/or a domain service E in parallel and/or in series, then the domain service D can itself call one or more other domain services in parallel and/or in series, and so on). In various embodiments, a request can be handleable and/or resolvable by any suitable chain and/or arrangement of invocable and/or nestable domain services (e.g., the gateway service can call one or more domain services in parallel and/or in series, a called domain service can itself call one or more other domain services in parallel and/or in series).

To promote proper functioning of such a service-oriented system, request validation can be implemented. Request validation (e.g., data validation) is the process of checking and/or vetting data received in a computerized request, call, and/or invocation at a gateway service and/or at a domain service, to ensure that the data meet/satisfy various characteristics, requirements, and/or rules required by the API of the gateway service and/or the API of the domain service. For example, the API of a gateway service and/or the API of a domain service may include one or more fields (e.g., input fields) that accept numbers and not strings, one or more fields that accept strings and not numbers, one or more fields that accept numbers above a minimum value and not numbers below the minimum value, one or more fields that accept numbers below a maximum value and not numbers above the maximum value, one or more fields that accept strings longer than a minimum length and not strings shorter than the minimum length, one or more fields that accept strings shorter than a maximum length and not strings longer than the maximum length, one or more fields that are optional, one or more fields that are mandatory, and/or any other suitable data characteristics/requirements.

For each computerized service (e.g., gateway service or domain service), the validation rules, characteristics, and/or requirements for the API of the computerized service can be specified in a request validation specification (e.g., request validation configuration) corresponding to the computerized service. In other words, the validation rules that correspond to a particular computing service can be listed in the request validation specification corresponding to that particular computing service. In some cases, the gateway service can have different request validation rules, characteristics, and/or requirements than the domain services, and different domain services can have different request validation rules, characteristics, and/or requirements than each other.

Conventionally, each computerized service (e.g., gateway service or domain service) in a service-oriented system stores its own corresponding request validation specification. When a request, call, or invocation is received at the computerized service from an entity (e.g., from a client and/or from an upstream computerized service), the computerized service validates the request, call, or invocation based on its own request validation specification (e.g., the computerized service checks that the data in the request, call, or invocation satisfy the characteristics, requirements, and/or rules that are listed and/or specified in its corresponding request validation specification). If validation is successful, the computerized service can request, call, or invoke one or more other computerized services (e.g., domain services) to handle and/or resolve the original request, call, or invocation, and these one or more other computerized services can perform their own separate validations based on their own separate request validation specifications.

Such conventional systems and/or techniques result in late and/or lazy detection of invalid requests. For example, suppose that a request is handleable by a first service, that the first service facilitates its functionality by calling a second service, and that the second service facilitates its functionality by calling a third service. Also, suppose that the request satisfies the request validation specifications of the first and second services but fails to satisfy the request validation specification of the third service. In such case, the first service receives the request, successfully validates the request based on its request validation specification, and accordingly calls the second service. The second service receives the call from the first service, successfully validates the call based on its request validation specification, and accordingly invokes the third service. Finally, the third service receives the invocation from the second service, unsuccessfully validates the invocation, and returns an error message (e.g., 4xx, 5xx). The error message is relayed from the third service to the second service, from the second service to the first service, and finally from the first service to the entity that sent the initial request to the first service.

As shown, in various cases, conventional request validation systems and/or techniques do not return an error message until after significant time and/or computing resources have already been expended by the first two services (e.g., detection of invalid data late in the API cycle). As mentioned above and/or throughout this description, a computing request can, in some cases, be handleable and/or resolvable by any suitable parallel and/or series arrangement and/or chain of nested domain services (e.g., the gateway service can call one or more domain services in parallel and/or in series, and any called domain service can itself call one or more other domain services in parallel and/or in series). In any of those instances, conventional request validation systems and/or techniques do not return error messages until late in the API cycle.

Moreover, conventional request validation systems and/or techniques implement validation schemes that are tightly coupled to the individual computerized service implementations. To continue the above example, suppose that updates to the request validation specifications of the first, second, and third services are desired. Because conventional systems and/or techniques store the separate request validation specifications locally in the separate computing services, such conventional request validation systems and/or techniques implement updates by independently pushing those updates to each of the first, second, and third services. Since the first, second, and third services can each have different coding syntaxes, languages, organizations, and/or implementations (e.g., JSON spec, XML spec), such conventional request validation systems and/or techniques can require significant effort and time spent separately coding the separate updates to be compatible with the separate services. Indeed, in various aspects, request validation is not conventionally defined in a granular level per-flow/integration for the unified API. Moreover, in some cases, programmers need to manually consider the code and specification annotations to understand the request validation implemented at a given computing service. Furthermore, migrating and/or optimizing a flow/API takes a lot of effort in various phases of software development if the mandatory/used data are not known clearly.

Various embodiments of the subject innovation can address one or more of these issues/problems by facilitating centralized request validation. One or more embodiments described herein include systems, computer-implemented methods, apparatus, and/or computer program products that can facilitate centralized request validation in a service-oriented computing system. In various instances, centralized request validation can be considered a new request validation technique and/or paradigm that can eliminate and/or reduce wasted computing time and/or wasted computing resources that are expended by conventional request validation techniques and/or paradigms. In other words, centralized request validation can, in various cases, facilitate request validation in less computing time and/or with fewer computing resources than can conventional request validation. Such efficiency gains clearly improve the functioning of service-oriented architectures and/or other computing devices and therefore constitute concrete technical improvements in the field of request validation.

In various aspects, embodiments of the subject innovation can be implemented as a central validation server in a service-oriented computing system. In various instances, the central validation server can comprise an input component, a central validation specification component, and an output component.

In various cases, the input component can receive a validation instruction from a gateway service. In various aspects, the validation instruction can be based on a request received by the gateway service from a computing client. In various instances, the request can be handleable and/or resolvable by an operational flow path through a plurality of domain services that are downstream of the gateway service. In various aspects, the operational flow path can be a chain of domain services downstream of the gateway service that, when invoked, can handle and/or resolve the request. That is, the computing client can send the request to the gateway service, and the request could be properly handled, resolved, and/or otherwise answered (e.g., the objective of the computing client could be fulfilled) if the plurality of domain services that make up the operational flow path were successfully invoked. In some cases, the operational flow path can involve a domain service requesting, calling, and/or invoking one or more other domain services. For instance, the operational flow path can involve multiple layers of domain services, where each layer comprises one or more domain services, where the one or more domain services of each layer are invoked by at least one domain service from the previous layer, and where the first layer is invoked by the gateway service. In some instances, the gateway service can derive (e.g., determine and/or identify) the operational flow path through the plurality of domain services that are downstream of the gateway service based on the request from the computing client. For instance, data and/or metadata contained in the request can indicate how the request is to be resolved and/or handled (e.g., can indicate which subset of a total collection of domain services should be directly and/or indirectly invoked to resolve and/or handle the request). Based on this data and/or metadata, the gateway service can, in some cases, identify which domain services it would have to invoke in order to successfully handle, resolve, and/or fulfill the request (e.g., the gateway service can identify the plurality of domain services that make up the operational flow path that would handle/resolve the request). Accordingly, the validation instruction sent from the gateway service to the input component of the central validation server can identify and/or indicate the plurality of domain services. In some embodiments, the gateway service can refer to the central validation server for information to derive the operational flow path (e.g., the gateway service can query the central validation server for data, metadata, and/or any other suitable information that identifies which domain services would be needed directly and/or indirectly to handle and/or respond to the computing request). In various other aspects, the gateway service can identify one or more domain services that should be directly invoked by the gateway service to handle and/or resolve the computing request, and the central validation server can identify and/or derive any other downstream dependencies (e.g., the gateway service can identify that the computing request is handleable and/or resolvable by domain service A and domain service B, the gateway service can pass this information to the central validation server via a validation instruction, and the central validation server can determine that the domain service A depends upon domain service C and that domain service C depends upon domain service D).

In various embodiments, the central validation specification component can store and/or maintain a plurality of request validation specifications respectively corresponding to the plurality of domain services. In various instances, a request validation specification can be an electronic file, document, and/or collection of data that specifies the validation rules, characteristics, and/or requirements of the API of a given computing service. In other words, each of the plurality of domain services can have its own associated request validation specification, and each of those request validation specifications can, in various cases, be stored and/or maintained in the central validation specification component (e.g., stored in a single, centralized location accessible by the gateway service and/or by each domain service). In some instances, less than all request validation specifications can be stored and/or maintained in the central validation specification component.

In various embodiments, the output component can transmit, in response to the validation instruction, the plurality of request validation specifications to the gateway service. In other words, the validation instruction can, in some cases, be considered as an instruction sent from the gateway service to the central validation server that instructs the central validation server to transmit to the gateway service the request validation specifications of the downstream domain services which the gateway service would have to directly and/or indirectly invoke in order to properly handle and/or resolve the request from the computing client. In various cases, the gateway service can validate the request received from the computing client based on the plurality of request validation specifications transmitted from the output component of the central validation server. In other words, the gateway service can check whether the request received from the computing client satisfies the request validation specifications of the plurality of domain services (e.g., the gateway service can perform a validation for itself as well as for all the downstream domain services that the gateway service would have to call/invoke in order to handle/resolve the request).

Overall, in various aspects, the central validation server can store and/or maintain a request validation specification for each available domain service in a service-oriented architecture. When the gateway service receives the request from the computing client, the gateway service can determine/identify which domain services (e.g., can identify which subset of the available domain services) it would need to directly and/or indirectly invoke in order to handle/resolve the request. Accordingly, the gateway service can fetch from the central validation server the request validation specification for each of the determined/identified domain services (e.g., for each domain service in the determined/identified subset). In some cases, the gateway service can also fetch its own request validation specification from the central validation server. Based on the fetched request validation specifications, the gateway service can validate the request from the computing client. If any of the fetched request validation specifications is not satisfied by the request, the gateway service can immediately send an appropriate error message (e.g., 4xx, 5xx) to the computing client without wasting any computing time and/or computing resources calling/invoking the determined/identified subset of domain services. In various instances, any suitable error message can be generated based upon a failure of the computing request to satisfy at least one fetched request validation specification. For example, a domain service A can require one or more corresponding data types $A_{type}$, can require one or more corresponding data values that are between $A_{min}$ and $A_{max}$, and/or can require that a particular data field be provided. In various aspects, the gateway service can learn about these requirements of the domain service A based on the fetched request validation specifications. In some cases, the gateway service can determine that the computing request does not satisfy the request validation specification of the domain service A (e.g., no input of data type $A_{type}$ is provided, provided data values are less than $A_{min}$ and/or greater than $A_{max}$, and/or a mandatory data field is empty). Accordingly, the gateway service can generate any suitable error message and/or can provide that error message to the computing client. In other words, the gateway service can, in some cases, determine that the request will not be successfully handled (e.g., because the request does not meet the validation requirements of at least one of the downstream domain services that are needed to handle/resolve the request) without wasting time and/or resources partially processing the request by calling and/or invoking the downstream domain services (e.g., if the request will ultimately fail, any time/resources consumed by the downstream domain services in furtherance of handling/resolving the request are wasted). Thus, in various aspects, embodiments of the invention can facilitate a greedy fail and/or fast fail centralized request validation paradigm, as opposed to a conventional lazy fail request validation paradigm.

As mentioned above, in conventional request validation systems and/or techniques, each computing service corresponds to a request validation specification, and each computing service locally stores and/or maintains its corresponding request validation specification. In such a conventional system and/or technique, a given computing service does not have access to the request validation specifications of computing services that are downstream and/or upstream of the given computing service (e.g., each computing service knows only its own validation rules, characteristics, and/or requirements; no computing service knows the validation rules, characteristics, and/or requirements of downstream and/or upstream computing services). Accordingly, once invoked, each computing service performs only its own request validation, which can waste time and/or resources. In contrast, in various embodiments of the subject innovation, the plurality of request validation specifications that correspond to the plurality of domain services can be stored in the central validation server (e.g., in the central validation specification component). Thus, various embodiments of the subject innovation can involve storing all (in some cases, less than all) the request validation specifications of the domain services in a single, centralized location rather than separately storing them in disparate locations. In various instances, the central validation specification component (e.g., the single, centralized location at which the request validation specifications can be stored and/or maintained) can be leveraged by a single computing service (e.g., the gateway service) to perform centralized request validation (e.g., the single computing service can perform the validations for itself and/or for one or more of the computing services that are downstream of the single computing service, without invoking any of the one or more downstream computing services). In this way, computing time and/or computing resources can be saved as compared to conventional request validation.

Consider the following example. Suppose that a computing client sends a request to a gateway service. Moreover, suppose that the request could be handled and/or resolved by the invocation of service A, service B, and service C, where service A's functionality requires invocation of service D, and where service D's functionality requires invocation of service E. In such a scenario, the request is handleable and/or resolvable by a three-layer operational flow path of domain services. The first layer of the operational flow path includes service A, service B, and service C, which can in some instances be invoked in parallel and/or in series by the gateway service. The second layer of the operational flow path includes service D, which can be invoked by service A after service A is successfully invoked by the gateway service. The third layer of the operational flow path includes service E, which can be invoked by service D after service D is successfully invoked by service A.

In various embodiments, the gateway service can derive, via any suitable technique, this operational flow path. That is, in various aspects, the gateway service can determine that successful handling of the request requires direct invocation of services A, B, and C, that successful invocation of service A can lead to invocation of service D, and that successful invocation of service D can lead to invocation of service E (e.g., the gateway service can determine the identities of services A, B, C, D, and E). In various instances, data and/or metadata pertaining to the request can be leveraged to derive the operational flow path (e.g., data and/or metadata concerning the request can indicate how the request is to be handled and/or resolved). In various aspects, it can be said that the gateway service directly invokes services A, B, and C and that the gateway service indirectly invokes services D and E. Accordingly, the gateway service can transmit to the input component of the central validation server a validation instruction, where the validation instruction identifies the domain services needed to successfully respond to, handle, and/or resolve the request (e.g., where the validation instruction identifies services A, B, C, D, and E).

In various embodiments, the central validation specification component of the central validation server can store and/or maintain request validation specifications respectively corresponding to services A, B, C, D, and E (e.g., a first request validation specification for service A, a second request validation specification for service B, a third request validation specification for service C, a fourth request validation specification for service D, and a fifth request validation specification for service E). In various aspects, the central validation specification component can store more than these five request validation specifications. For instance, in some cases, the central validation specification component can store a request validation specification for each domain service that is available in the service-oriented architecture and/or that could possibly be called and/or invoked by the gateway service and/or by another domain service. For instance, in some cases, a particular service-oriented architecture can include hundreds or thousands of available domain services, the central validation specification component can store the request validation specification of each of those hundreds or thousands of available domain services, and the validation instruction can identify the subset of those hundreds or thousands of available domain services that can be needed to successfully handle and/or resolve the request from the client. In some cases, the central validation specification component of the central validation server can store the request validation specification corresponding to the gateway service.

In various embodiments, the output component of the central validation server can transmit, in response to the validation instruction, the five request validation specifications corresponding to services A, B, C, D, and E (e.g., can transmit to the gateway service the subset of domain services needed to properly handle and/or resolve the request, which subset can be identified in the validation instruction). In some cases, the output component of the central validation server can also transmit to the gateway service the request validation specification corresponding to the gateway service. Accordingly, the gateway service can validate the request based on the request validation specifications transmitted by the output component of the central validation server. In this way, if the gateway service determines that the request fails to satisfy at least one of the transmitted request validation specifications, the gateway service can immediately generate an error message (e.g., 4xx, 5xx, and/or any other suitable unsuccessful validation message) without invoking any of services A, B, C, D, and E.

To emphasize the efficiency benefits of various embodiments of the subject innovation, consider how a conventional request validation system and/or technique would operate in the above example. Suppose that the request satisfies the request validation specifications for services A, B, C, and D and fails to satisfy the request validation specification for service E. Conventionally, the gateway service and each of services A, B, C, D, and E would store their own request validation specification. Thus, the gateway service would know the validation rules for its own API but not the validation rules for the APIs of services A, B, C, D, or E. Similarly, service A would know the validation rules for its own API but not the validation rules for the APIs of services D or E. Likewise, service D would know the validation rules for its own API but not the validation rules for the API of service E. And so on. In such case, the gateway service would validate that its request validation specification is satisfied and would then invoke services A, B, and C. Each of services A, B, and C would then expend computing time and/or computing resources validating that the request satisfies their own request validation specifications, and service A would then invoke service D. Service D would then expend computing time and/or computing resources validating that the request satisfies its own request validation specification, and service D would then invoke service E. Service E would then expend computing time and/or computing resources validating that the request does not satisfy its own request validation specification. Thus, an error message is generated by service E, is relayed to service D, is relayed to service A, is relayed to the gateway service, and finally is relayed to the computing client. As shown in this example, the request was overall invalid, yet significant computing time and computing resources were wasted by calling/invoking services A, B, C, D, and E. Moreover, services B and C, in various cases, can have already begun processing and/or handling their portions of the request while service A is waiting for validation from services D and E. Since the request ultimately failed, those resources expended by services B and C in partially handling/resolving the request are wasted.

In stark contrast, embodiments of the subject innovation can avoid and/or reduce such wasted computing time and/or computing resources by implementing centralized request validation. Because the central validation server transmits to the gateway service all five of the request validation specifications respectively corresponding to services A, B, C, D, and E, the gateway service can determine that the request does not satisfy the request validation specification of service E, without ever having to even call/invoke services A, B, C, D, or E. Thus, in various aspects, less computing time and/or fewer computing resources can be expended than in conventional request validation systems and/or techniques.

Again, as mentioned above, the central validation server can, in various aspects, store and/or maintain a request validation specification for each available domain service in the service-oriented architecture (e.g., services A, B, C, D, and E as well as all other available domain services in the service-oriented architecture). The gateway service can receive the request from the computing client and can identify which subset of the available domain services can successfully handle and/or resolve the request (e.g., can identify that the request is handleable by invocation of services A, B, C, D, and E). The gateway service can fetch from the central validation server the request validation specifications corresponding to the identified subset of domain services (e.g., fetch the request validation specifications corresponding to services A, B, C, D, and E; in some cases, the gateway service can also fetch its own request validation specification from the central validation server). The gateway service can validate the request based on the fetched request validation specifications. Thus, if the gateway service determines that the request fails to satisfy at least one of the fetched request validation specifications, the gateway service can immediately send an error message to the computing client without wasting time and/or resources calling the identified subset of domain services (e.g., without calling services A, B, C, D, or E).

As shown in the above example, the central validation server can, in various aspects, transmit one or more request validation specifications to the gateway service, in response to a validation instruction from the gateway service that identifies the one or more domain services corresponding to the one or more request validation specifications (e.g., that identifies the one or more domain services needed to handle the request). In various other embodiments, the central validation server can transmit one or more request validation specifications to a domain service that is downstream of the gateway service or downstream of another domain service, in response to a validation instruction from the domain service that identifies the one or more domain services that correspond to the one or more request validation specifications (e.g., that identifies the one or more domain services needed to handle the request).

Specifically, in various embodiments, the input component can receive a validation instruction from a first domain service. In various cases, the validation instruction can be based on a request received by the first domain service from a gateway service upstream of the first domain service or from another domain service upstream of the first domain service. In various aspects, the request can be handleable and/or resolvable by an operational flow path through a plurality of domain services that are downstream of the first domain service. In various cases, the first domain service can derive (e.g., determine and/or identify) the plurality of domain services that make up the operational flow path and that are needed to handle and/or resolve the request, and the validation instruction can accordingly identify the plurality of domain services. In various embodiments, the central validation specification component can store and/or maintain a plurality of request validation specifications respectively corresponding to the plurality of domain services. In various embodiments, the output component can transmit, in response to the validation instruction, the plurality of request validation specifications to the first domain service. Accordingly, the first domain service can validate the request based on the plurality of request validation specifications. In some cases, the first domain service can determine that the request fails to satisfy at least one of the request validation specifications and generate an appropriate error message without invoking any of the plurality of domain services.

Consider again the above example where the operational flow path has three layers, the first comprising services A, B, and C which can be invoked by the gateway service, the second comprising service D which can be invoked by service A, and the third comprising service E which can be invoked by service D. Suppose that the request contains a first data element and a second data element that each satisfy the request validation specifications for services A, B, C, D, and E (e.g., the first data element and the second data element can be strings of certain lengths and/or numbers of certain magnitudes, and those lengths and/or magnitudes can be consistent with and/or can be not contrary to the request validation specifications of services A, B, C, D and E). Further, suppose that the request lacks a third data element that is mandatory for services D and E and not mandatory for services A, B, and C. Further still, suppose that this third data element is designed to be populated by service A.

In such case, the request satisfies the request validation specifications of services A, B, and C. However, the request does not, on its face, satisfy the request validation specifications of services D and E. After all, the third data element is mandatory on services D and E, but the request lacks the third data element. Nevertheless, the gateway service can, in some cases, validate the request because the third data element is designed and/or supposed to be populated/provided by service A (e.g., the request validation specifications of services D and E can indicate that the third data element is mandatory on services D and E, and the request validation specification for service A can, in some instances, inform the gateway service that service A is capable of populating and/or generating and/or obtaining an appropriate third data element to supplement the request). In other words, in various cases, the gateway service can learn from the fetched request validation specifications what data elements and/or what data types/categories are designed to be populated and/or provided and/or obtained by which downstream domain services. Based on this information, the gateway service can actively determine and/or infer that a currently incomplete request is designed and/or expected to be appropriately supplemented by one or more downstream domain services such that the request would then be in compliance with all the fetched request validation specifications. In this exemplary case, the gateway service can determine that the request lacks the third data element, can determine from the fetched request validation specifications that the third data element is mandatory on services D and E, and can determine from the fetched request validation specifications that service A is configured to provide the third data element before services D and E are invoked. In such case, the gateway service can validate the request and can accordingly invoke services A, B, and C (e.g., although the request lacks a data element mandatory on services D and E, that data element is designed to be populated by service A and is thus not expected and/or required to be provided by the request). In various instances, the gateway service can infer and/or expect that the third data element that will be provided/populated by service A will be valid (e.g., since the third data element has not yet been populated when the gateway service is performing its validation, the gateway service cannot definitively determine whether the third data element will actually be valid or invalid; instead, the gateway service can determine that service A is designed and/or configured to populate/provide the third data element to the request and that the third data element has the potential to be valid).

In various aspects, once populated by service A, the third data element can become part of a request, call, or invocation sent from service A to service D. Suppose that the newly populated third data element does not satisfy the request validation specification of service E (e.g., the newly populated third data element is of an inappropriate type and/or category and/or has an inappropriate length and/or magnitude). In such case, the input component of the central validation server can receive a validation instruction from service D, where the validation instruction identifies service E (e.g., identifies the domain services that are downstream of service D and that are needed to respond to the request received by service D). In various cases, the central validation specification component can store and/or maintain two request validation specifications respectively corresponding to services D and E. In various aspects, the output component can transmit to service D, in response to the validation instruction, the two request validation specifications corresponding to services D and E. Accordingly, service D can validate the request that it received from service A based on the request validation specifications for services D and E (e.g., service D can determine whether the newly populated third data element satisfies the validation rules of itself and the validation rules of service E). In various cases, service D can determine that the newly populated third data element does not satisfy the request validation specification of service E, and service D can accordingly generate an error message (e.g., 4xx, 5xx) without invoking service E. Again, in this way, less computing time and/or fewer computing resources can be wasted via centralized request validation as compared to conventional request validation. In various aspects, the domain service that populates a new data element can perform a validation on that newly populated data element in accordance with various embodiments.

In other words, the central validation server can, in various aspects, store and/or maintain a request validation specification for each available domain service in the service-oriented architecture (e.g., services A, B, C, D, and E as well as all other available domain services in the service-oriented architecture). Service D can receive a request from service A and can identify which subset of the available domain services can successfully handle and/or resolve the request received from service A (e.g., can identify that the request received from service A is handleable by invocation of service E). Service D can fetch from the central validation server the request validation specifications corresponding to the identified subset of domain services (e.g., fetch the request validation specification corresponding to service E; in some cases, service D can also fetch its own request validation specification from the central validation server). Service D can validate the request received from service A based on the fetched request validation specifications. Thus, if service D determines that the request fails to satisfy at least one of the fetched request validation specifications, service D can immediately send an error message to service A without wasting time and/or resources calling the identified subset of domain services (e.g., without calling service E).

Note that, in this example, the first computing service at which the populated data element can be validated is service D (e.g., the populated data element does not exist in this example until provided by service A). In some cases, however, service A can validate the populated data element. In various aspects, this example illustrates how various embodiments of the subject innovation can facilitate a greedy fail and/or fast fail request validation paradigm (e.g., centralized request validation can be used to detect invalid computing requests/data as early as possible in the API cycle to reduce the amount of time and/or resources spent partially processing ultimately invalid requests).

In various other embodiments, the central validation server can itself perform validations requested by the gateway service or by a domain service. In various aspects, the input component of the central validation server can receive a validation instruction from a first computing service (e.g., a gateway service or a domain service). In various cases, the validation instruction can be based on a request received by the first computing service, where the request is resolvable and/or handleable by an operational flow path through a plurality of computing services downstream of the first computing service (e.g., the validation instruction can, in some cases, function as a publication of the request to the central validation server). In various embodiments, the central validation specification component can store and/or maintain a plurality of request validation specifications respectively corresponding to the plurality of domain services. In various instances, the output component can validate the request based on the plurality of request validation specifications. If the output component determines that the request fails to satisfy at least one of the plurality of request validation specifications, the output component can transmit an unsuccessful validation message to the first computing service, and the first computing service can avoid invoking any of the plurality of computing services. Again, various embodiments of the subject innovation can facilitate centralized request validation, which can result in saved computing time and/or saved computing resources as compared to conventional request validation (e.g., embodiments of the subject innovation can help to reduce the amount of computing time and/or computing resources that are spent partially processing ultimately invalid requests).

Furthermore, embodiments of the subject innovation can facilitate easier and/or more efficient updating to request validation specifications. Since conventional request validation specifications are stored locally in disparate locations, updating the request validation specifications requires independently pushing independently coded updates at the service level (e.g., pushing the updates to each individual computing service in the service-oriented architecture). In contrast, embodiments of the subject innovation can store all the request validation specifications in a single, centralized location (e.g., the central validation server). Thus, updating the request validation specifications can, in various instances, be facilitated by simply pushing the updates only to the central validation server. In this way, multiple independent pushes to each computing service in the service-oriented architecture can be avoided.

As explained above, a validation instruction can, in various embodiments, be an instruction generated by a computing service (e.g., a gateway service and/or a domain service) and received by the central validation server, wherein the instruction commands the central validation server to transmit to the computing service one or more request validation specifications identified in the instruction. This can, in various instances, allow the computing service to perform request validation based on the transmitted request validation specifications (e.g., the computing service can use the validation instruction to fetch one or more request validation specifications from the central validation server and can perform request validation based on the fetched validation specifications). As also explained above, a validation instruction can, in various other embodiments, be an instruction generated by a computing service (e.g., a gateway service and/or a domain service) and received by the central validation server, wherein the instruction commands the central validation server to perform a validation on a computing request identified in the instruction. This can, in various instances, allow the central validation server to validate the request and to return a result (e.g., successful and/or unsuccessful validation) to the computing service (e.g., the computing service can publish a received computing request to the central validation server, and the central validation server can validate the published request based on its stored request validation specifications and can return a result to the computing service).

Various embodiments of the subject innovation can be employed to use hardware and/or software to solve problems that are highly technical in nature (e.g., to facilitate centralized request validation in a service-oriented architecture), that are not abstract and that cannot be performed as a set of mental acts by a human. Further, some of the processes performed can be performed by a specialized computer (e.g., central validation server) for carrying out defined tasks related to centralized request validation (e.g., receiving a validation instruction from a first computing service, wherein the validation instruction is based on a request received by the first computing service, and wherein the request is handleable by an operational flow path through a plurality of computing services downstream of the first computing service; maintaining a plurality of request validation specifications corresponding to the plurality of computing services; transmitting, in response to the validation instruction, the plurality of request validation specifications to the first computing service, wherein the first computing service validates the request based on the plurality of request validation specifications). Such defined tasks are not conventionally performed manually by humans. Moreover, neither the human mind nor a human with pen and paper can receive a validation instruction, store/maintain a plurality of request validation specifications, transmit the plurality of request validation specifications to a computing service, or validate a request based on the plurality of request validation specifications. Instead, various embodiments of the subject innovation are inherently and inextricably tied to computer technology and cannot be implemented outside of a computing environment (e.g., embodiments of the subject innovation constitute an improved request validation paradigm that can only be implemented in a service-oriented computing architecture and/or another computing environment).

In various instances, embodiments of the invention can integrate into a practical application the disclosed teachings regarding centralized request validation. Indeed, in various embodiments, the disclosed teachings can provide a central validation server that can be implemented in a service-oriented computing architecture to facilitate centralized request validation. Such a central validation server can result in request validation processes that require less computing time and/or fewer computing resources than conventional request validation, and so is clearly a useful and practical application of computers.

Moreover, various embodiments of the invention can provide technical improvements to and solve problems that arise in the field of request validation. After all, existing request validation systems and/or techniques locally store request validation specifications at the corresponding computing service. The result is that no computing service has access to the request validation specifications of downstream services, which can require numerous and repetitive iterations of request validation to be performed. In stark contrast, embodiments of the subject innovation can facilitate centralized request validation, where the request validation specifications of computing services can be stored in a single, centralized location accessible to all the computing services in the domain. Because the request validation specifications can be accessible to all the computing services in the domain, any given computing service can validate that a received request satisfies not only its own API validation rules, but also the API validation rules of one or more downstream services. In other words, each computing service layer can validate data dependencies for their responsibility to a downstream service. In this way, embodiments of the subject innovation can facilitate a fail fast validation paradigm (e.g., greedy fail as opposed to lazy fail) that can save time and/or that can help to optimize resource utilization during validation processes. Moreover, because all the request validation specifications are, in various aspects, stored in a single, centralized location, updates to the request validation specifications need not be individually and/or independently pushed at the service level. Instead, unified control of validation specification updates can be facilitated. Overall, embodiments of the subject innovation can provide these tangible, technical, concrete improvements over conventional request validation systems and/or techniques.

Furthermore, various embodiments of the subject innovation can control real-world devices based on the disclosed teachings. For example, embodiments of the innovation can be implemented as a real-world central validation server that operates in a real-world service-oriented computing environment. In various aspects, a real-world computing service can receive a real-world request (e.g., from a real-world computing client, from an upstream real-world computing service). The central validation server can, in various aspects, store and/or maintain multiple real-world request validation specifications corresponding to multiple computing services downstream of the real-world computing service that are needed to resolve and/or handle the real-world request. In various aspects, the central validation server can transmit the multiple real-world request validation specifications to the real-world computing service, and the real-world computing service can validate the request based on the multiple real-world request validation specifications. In various other embodiments, the central validation server can itself validate the request based on the multiple real-world request validation specifications and can return a validation results message to the real-world computing service.

FIG. 1 illustrates a high-level block diagram of a conventional request validation system 100. As shown, the conventional request validation system 100 can involve a client 102, a gateway service 104, a domain service 106, and/or a domain service 108. As shown, the gateway service 104 can store and/or maintain its own corresponding request validation specification 116 (e.g., a digital file and/or document that specifies the API requirements of the gateway service 104). Similarly, the domain service 106 can store and/or maintain its own request validation specification 118 (e.g., a digital file and/or document that specifies the API requirements of the domain service 106). Likewise, the domain service 108 can store and/or maintain its own request validation specification 120 (e.g., a digital file and/or document that specifies the API requirements of the domain service 108). In various aspects, the client 102 can communicate with the gateway service 104 (e.g., denoted by numeral 110), the gateway service 104 can communicate with the domain service 106 (e.g., denoted by numeral 112), and the domain service 106 can communicate with the domain service 108 (e.g., denoted by numeral 114). For ease of explanation, only two domain services (e.g., 106 and 108) are depicted in FIG. 1, but any suitable number and/or arrangement of domain services can be implemented (e.g., in parallel and/or in series).

In various aspects, the gateway service 104 can function as a unified point of interaction for the client 102. In various instances, the client 102 can send a computing request to the gateway service 104. Suppose that the computing request is resolvable and/or handleable by the domain service 106, and that the domain service 106 facilitates its functionality by calling the domain service 108. Also, suppose that the computing request satisfies the request validation specification 116 and the request validation specification 118, but does not satisfy the request validation specification 120. In such case, the gateway service 104 can receive the computing request from the client 102 and can validate that the computing request satisfies the request validation specification 112. The gateway service 104 can then invoke and/or call the domain service 106. In some embodiments, this can be facilitated by the gateway service 104 simply passing the original computing request to the domain service 106. In other embodiments, this can be facilitated by the gateway service 104 generating a new computing request based on the original computing request from the client 102, and sending this new computing request to the domain service 106 (e.g., the new computing request can contain data from the original computing request that is needed by the domain service 106 and/or can omit data from the original computing request that is not needed by the domain service 106). The domain service 106 can receive the invocation and/or call from the gateway service 104 (e.g., can receive the passed-through computing request and/or the new computing request) and can validate that the invocation and/or call satisfies the request validation specification 114. The domain service 106 can then invoke and/or call (as described above) the domain service 108. The domain service 108 can receive an invocation and/or call from the domain service 106 and can validate that the invocation and/or call does not satisfy the request validation specification 120. Accordingly, the domain service 108 can generate an error message (e.g., 4xx, 5xx, and/or any other suitable unsuccessful validation message), which can be relayed to the domain service 106, and then to the gateway service 104, and finally to the client 102.

As shown above, the conventional request validation system 100 can, in some cases, waste computing time and/or computing resources during validation processes. Specifically, the computing request from the client 102 did not satisfy the request validation specification 120 and thus would ultimately fail. Yet, the conventional request validation system 100 nevertheless expended computing time and/or computing resources calling/invoking the domain service 106 and the domain service 108 in an effort to handle/resolve the computing request. In various instances, this waste can be caused by the fact that the request validation specifications 116, 118, and 120 are separately stored in disparate locations. As explained herein, storing and/or maintaining the request validation specifications 116, 118, and 120 in a single, centralized location that is accessible to the gateway service 104, the domain service 106, and/or the domain service 108 can eliminate and/or reduce such waste.

Figure 2:
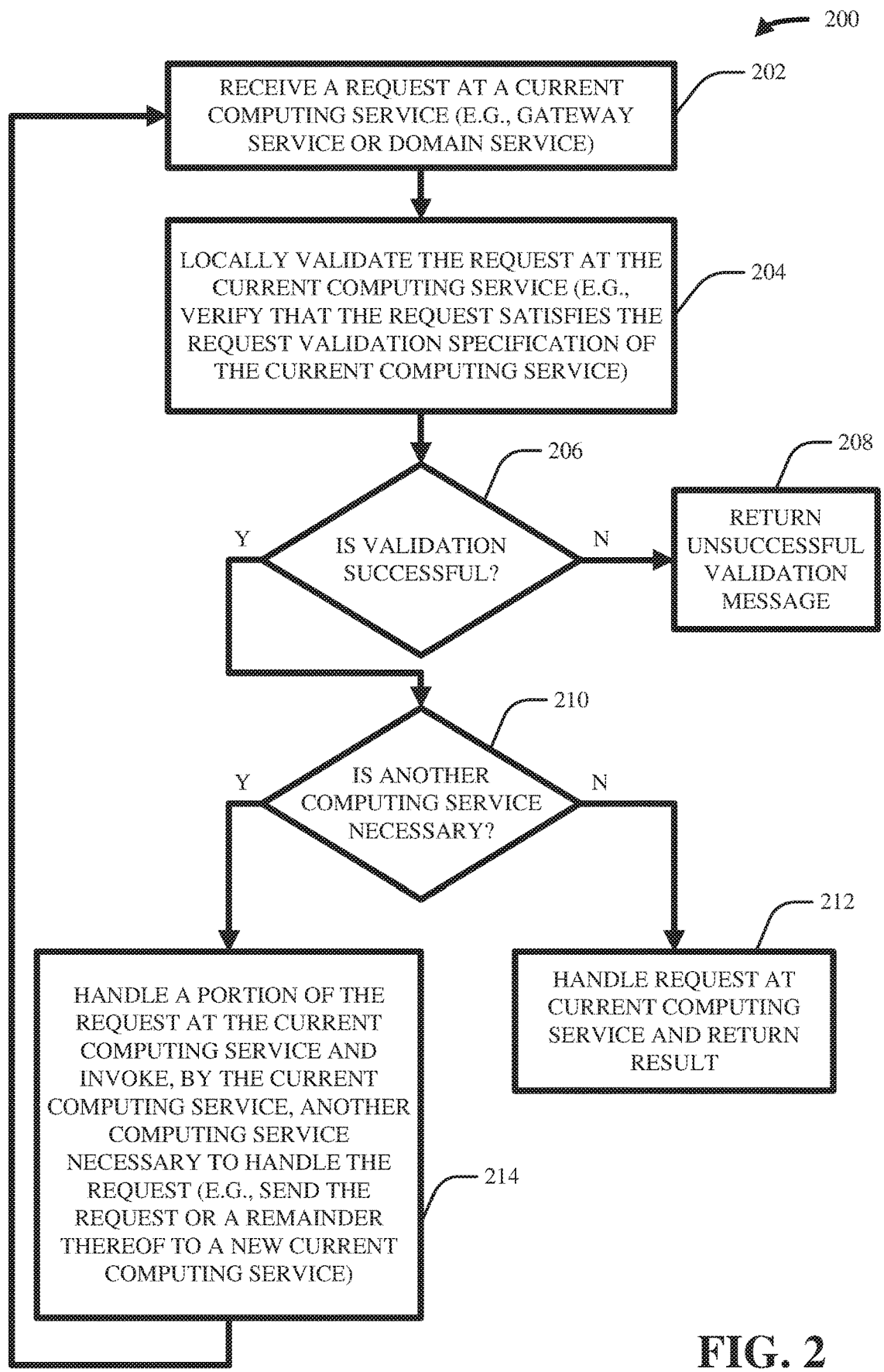
FIG. 2 illustrates a high-level flow diagram of a conventional request validation method.

FIG. 2 illustrates a high-level flow diagram of a conventional request validation method 200. In various aspects, the conventional request validation method 200 can be facilitated by the conventional request validation system 100.

In various embodiments, act 202 can include receiving a request at a current computing service (e.g., a gateway service or a domain service). In various instances, act 204 can include locally validating the request at the current computing service (e.g., verifying that the request satisfies the request validation specification of the current computing service). In various aspects, act 206 can include determining whether the validation was successful. If not, act 208 can be performed. If so, act 210 can be performed. In various cases, act 208 can include returning by the current computing service an unsuccessful validation message in response to the request. In various embodiments, act 210 can include determining whether another computing service is necessary to handle and/or resolve the request. If not, act 212 can be performed. If so, act 214 can be performed. In various instances, act 212 can include handling the request at the current computing service and returning a result in response to the request. In various aspects, act 214 can include handling a portion of the request at the current computing service and/or invoking, by the current computing service, another computing service that is necessary to handle and/or resolve the request (e.g., the current computing service can send the request and/or a remainder of the request to a new current computing service). In various aspects, act 214 can loop back to act 202.

As shown, the conventional request validation method 200 relies on local validation, such that each computing service can only validate that a received request satisfies its own API validation rules, and such that no computing service can validate that a received request satisfies the API validation rules of downstream computing services. The result is that the conventional request validation method 200 can repeatedly iterate from act 202 to act 204 to act 206 to act 210 to act 214 and back to act 202, until one invoked computing service fails to validate the request (e.g., act 208) or until all invoked computing services successfully validate the request (e.g., act 212). For a computing request that will ultimately fail, such repetitive iterations constitute wasted computing time and/or wasted computing resources.

Figure 3:
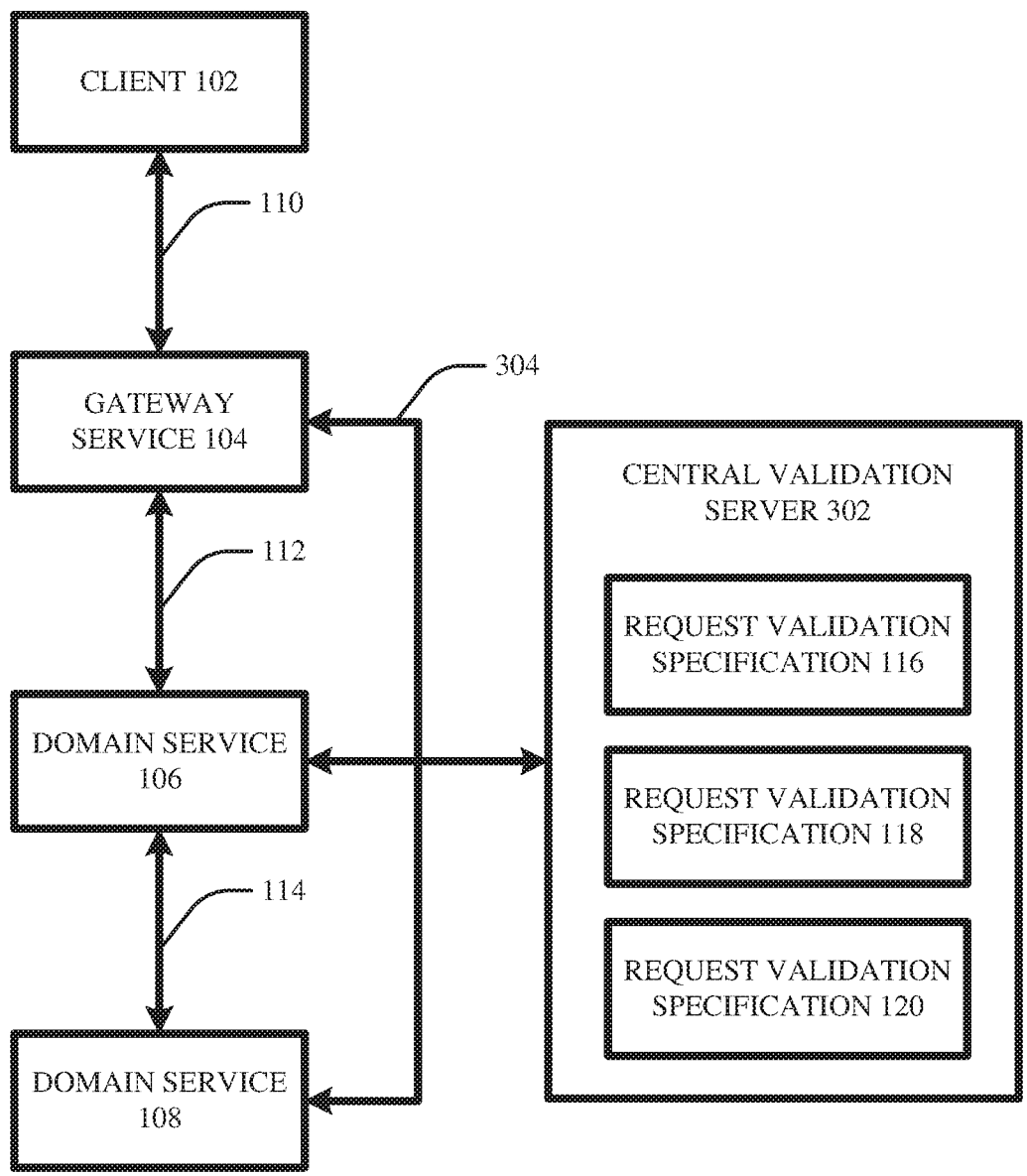
FIG. 3 illustrates a high-level block diagram of an example, non-limiting system that facilitates centralized request validation in accordance with one or more embodiments described herein.

FIG. 3 illustrates a high-level block diagram of an example, non-limiting system 300 that can facilitate centralized request validation in accordance with one or more embodiments described herein. In various aspects, FIG. 3 illustrates the benefits that can be achieved when embodiments of the subject innovation are applied to the conventional request validation system 100. As shown, the system 300 can include the client 102, the gateway service 104, the domain service 106, and/or the domain service 108. As shown, the client 102 can communicate with the gateway service 104 (e.g., denoted by numeral 110), the gateway service can communicate (e.g., call/invoke) the domain service 106 (e.g., denoted by numeral 112), and the domain service 106 can communicate (e.g., call/invoke) the domain service 108 (e.g., denoted by numeral 114).

As shown, in various embodiments, the system 300 can include a central validation server 302. In various aspects, the central validation server 302 can store and/or maintain the request validation specification 116 which corresponds to the gateway service 104, the request validation specification 118 which corresponds to the domain service 106, and/or the request validation specification 120 which corresponds to the domain service 108. In various aspects, the central validation server 302 can communicate with the gateway service 104, the domain service 106, and/or the domain service 108 (e.g., denoted by numeral 304). In other words, the central validation server 302 can be accessible to the gateway service 104, the domain service 106, and/or the domain service 108.

In various aspects, the central validation server 302 can eliminate and/or reduce computing time and/or computing resources that are wasted during conventional request validation. Again, suppose that the client 102 sends a computing request to the gateway service 104, that the computing request can be handled by the domain service 106, and that the domain service 106 facilitates its functionality by calling/invoking the domain service 108. Furthermore, suppose that the computing request satisfies the request validation specification 116 and the request validation specification 118, but does not satisfy the request validation specification 120. In various aspects, the gateway service 104 can receive the computing request from the client 102 and can derive an operational flow path through one or more downstream computing services that are required to handle and/or resolve the computing request. In other words, the gateway service 104 can determine, based on data and/or metadata pertaining to the computing request from the client 102, that the domain service 106 and the domain service 108 can be needed to handle and/or resolve the computing request. Accordingly, the gateway service 104 can send a validation instruction to the central validation server 302, where the validation instruction can identify the downstream domain services whose invocation is required for handling/resolving the computing request (e.g., the validation instruction can identify the domain service 106 and the domain service 108). In various aspects, the central validation server 302 can transmit, to the gateway service 104 and in response to the validation instruction, the request validation specifications corresponding to the downstream domain services identified in the validation instruction (e.g., the central validation server 302 can transmit to the gateway service 104 the request validation specification 118 and the request validation specification 120). In some cases, the central validation server 302 can transmit to the gateway service 104 the request validation specification corresponding to the gateway service 104 (e.g., the request validation specification 116). In various instances, the gateway service 104 can validate the computing request from the client 102 based on the transmitted request validation specifications (e.g., based on the request validation specifications 116, 118, and 120) before invoking any of the identified downstream domain services (e.g., before the gateway service 104 invokes the domain service 106, and before the domain service 106 invokes the domain service 108). In various aspects, the gateway service 104 can determine that the computing request does not satisfy the request validation specification 120. Accordingly, the gateway service 104 can send an appropriate error message (e.g., 4xx, 5xx, and/or any other suitable unsuccessful validation message) to the client 102 without invoking and/or calling the derived operational flow path (e.g., without invoking the domain service 106 and/or the domain service 108).

As shown, in various aspects, the system 300 can save computing time and/or computing resources as compared to the conventional request validation system 100. As mentioned above, the conventional request validation system 100 wasted computing time and/or computing resources invoking and/or calling the domain service 106 and the domain service 108 despite the fact that the computing request would ultimately fail. In stark contrast, the system 300 was able to determine that the computing request was invalid without having to invoke/call the domain service 106 or the domain service 108. In various instances, this benefit (e.g., saved computing time and/or saved computing resources) can be due to the fact that the request validation specifications (e.g., 116, 118, 120) can be stored and/or maintained in the central validation server 302 rather than separately stored in their corresponding computing services (e.g., as shown in FIG. 1). By storing and/or maintaining the request validation specifications in the central validation server 302, each computing service in a service-oriented architecture can have access to the request validation specifications. In other words, each computing service can know not only its own API validation requirements, but also the API validation requirements of downstream services.

As explained above, in various embodiments, the gateway service 104 can receive a request, identify which downstream services it would need to invoke in order to handle the request, fetch from the central validation server 302 the request validation specifications of those identified downstream services, and validate the request based on the fetched request validation specifications. In various other embodiments, the central validation server 302 can itself perform the validation. For example, the gateway service 104 can receive a computing request from the client 102 and can, in some aspects, publish the computing request to the central validation server 302. In various instances, the central validation server 302 can derive, based on data and/or metadata pertaining to the computing request, the operational flow path of downstream services needed to handle and/or resolve the computing request (e.g., the central validation server 302 can determine that the request requires invocation of the domain service 106 and the domain service 108). In various embodiments, rather than transmitting the request validation specifications corresponding to the derived operational flow path to the gateway service 104, the central validation server 302 can itself validate the computing request based on the request validation specifications corresponding to the derived operational flow path (e.g., request validation specifications 116, 118, and 120). In various cases, the central validation server 302 can determine that the computing request does not satisfy the request validation specification 120. Accordingly, the central validation server 302 can send an appropriate error message (e.g., 4xx, 5xx, and/or any other suitable unsuccessful validation message) to the gateway service 104. The gateway service 104 can relay the error message to the client 102, without invoking and/or calling the derived operational flow path (e.g., without invoking and/or calling the domain service 106 and/or the domain service 108).

In various embodiments, the central validation server 302 can receive and respond to (as described above) validation instructions from any suitable computing service in a service-oriented architecture (e.g., from the gateway service 104, from the domain service 106, and/or from the domain service 108).

Figure 4:
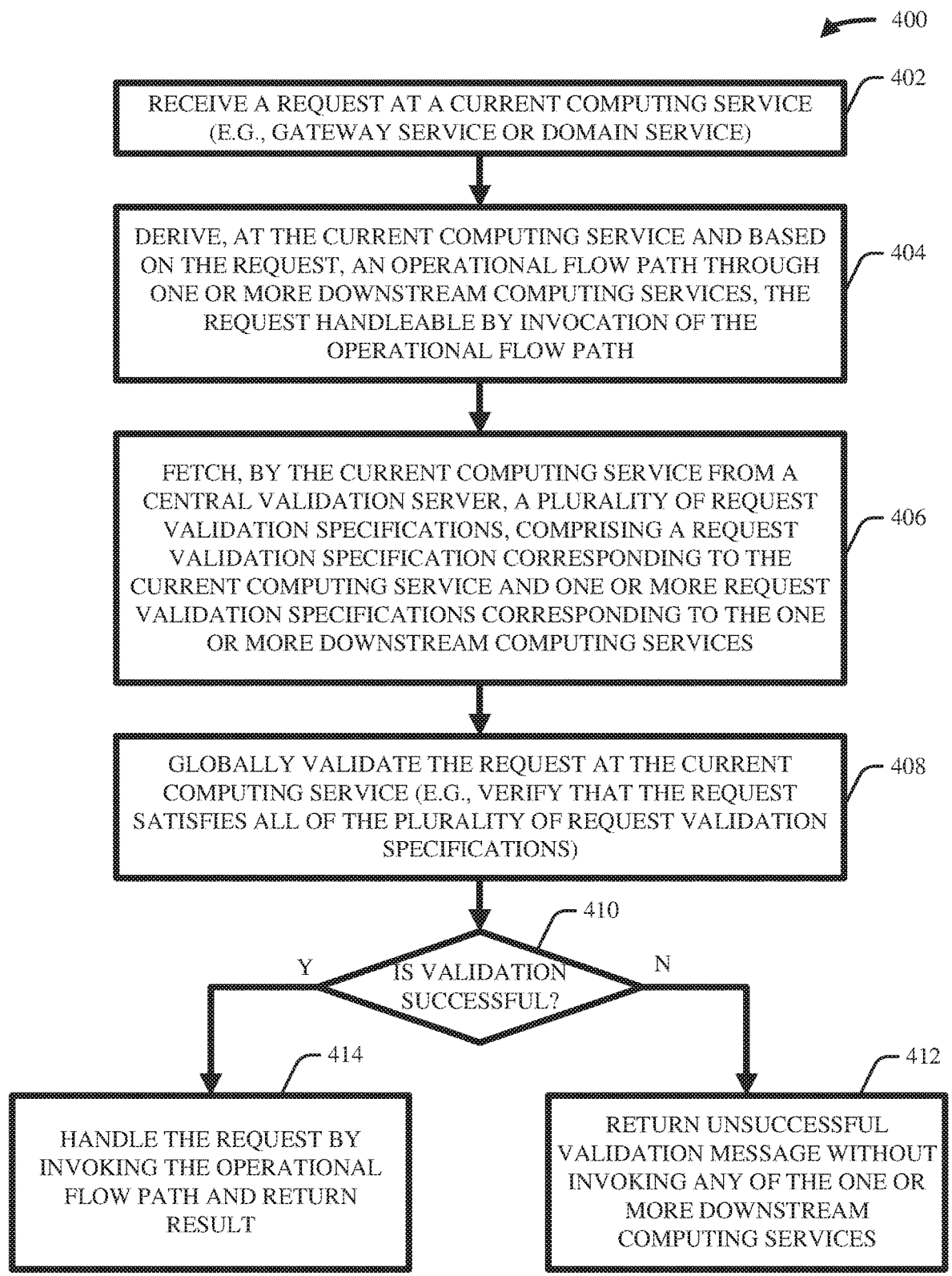
FIGS. 4-5 illustrate high-level flow diagrams of example, non-limiting computer-implemented methods that facilitate centralized request validation in accordance with one or more embodiments described herein.
Figure 5:
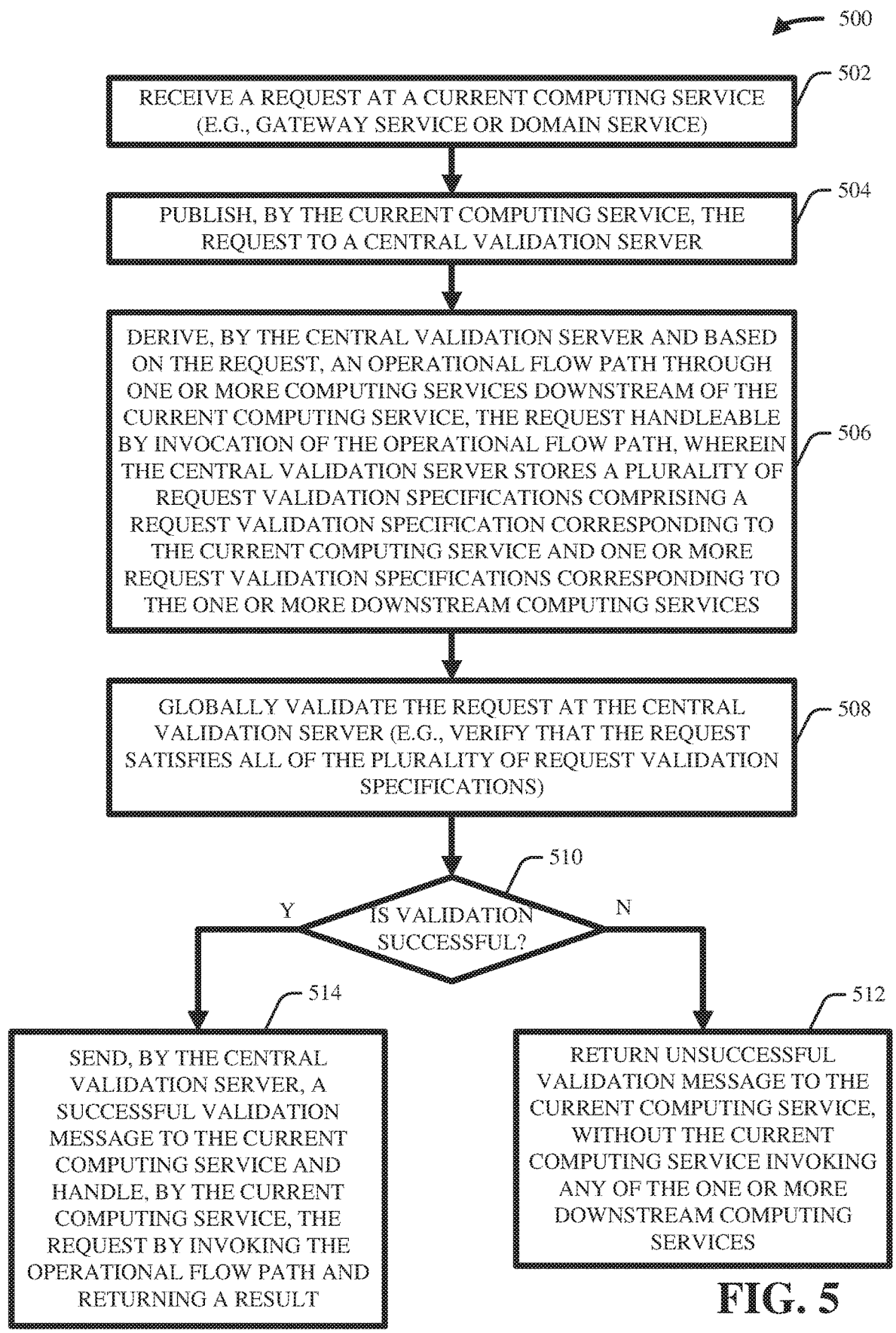

FIGS. 4-5 illustrate high-level flow diagrams of example, non-limiting computer-implemented methods 400 and 500 that can facilitate centralized request validation in accordance with one or more embodiments described herein. In various aspects, the computer-implemented methods 400 and/or 500 can be facilitated by the system 300.

In various embodiments, act 402 can include receiving a request at a current computing service (e.g., at a gateway service and/or a domain service). In various instances, act 404 can include deriving, at the current computing service and based on the request, an operational flow path through one or more downstream computing services, where the request is handleable by invocation of the operational flow path. In various aspects, act 406 can include fetching, by the current computing service from a central validation server, a plurality of request validation specifications, where the plurality of request validation specifications comprise a request validation specification corresponding to the current computing service and/or one or more request validation specifications corresponding to the one or more downstream computing services. In various cases, act 408 can include globally validating the request at the current computing service (e.g., verifying that the request satisfies all of the plurality of request validation specifications). In various embodiments, act 410 can include determining whether the validation is successful. If not, act 412 can be performed. If so, act 414 can be performed. In various aspects, act 412 can include returning, by the current computing service, an unsuccessful validation message without invoking any of the one or more downstream computing services. In various instances, act 414 can include handling, by the current computing service, the request by invoking the operational flow path (e.g., directly and/or indirectly invoking the one or more downstream computing services) and returning a result.

As shown, the computer-implemented method 400 can facilitate centralized request validation, which can save computing time and/or computing resources as compared to the conventional request validation method 200. As explained above, the conventional request validation method 200 wasted computing time and/or computing resources because it involved repetitively iterating through local validations (e.g., each service validates only its own API requirements). In stark contrast, the computer-implemented method 400 does not include such a wasteful loop, as shown. Instead of having each computing service only validating that its own API validation rules are satisfied, the computer-implemented method 400 involves having each computing service also validating that the API validation rules of downstream services are satisfied. As explained herein, this can result in a fail fast request validation paradigm that can save computing time and/or computing resources.

The computer-implemented method 500 can illustrate embodiments of the subject innovation where the central validation server itself validates received requests. In various embodiments, act 502 can include receiving a request at a current computing service (e.g., at a gateway service or at a domain service). In various instances, act 504 can include publishing, by the current computing service, the request to a central validation server. In various aspects, act 506 can include deriving, by the central validation server and based on the request, an operational flow path through one or more computing services downstream of the current computing service, where the request is handleable by invocation of the operational flow path. In some cases, the central validation server can store a plurality of request validation specifications, comprising a request validation specification corresponding to the current computing service and one or more request validation specifications corresponding to the one or more downstream computing services. In various embodiments, act 508 can include globally validating the request at the central validation server (e.g., verifying that the request satisfies all of the plurality of request validation specifications). In various instances, act 510 can include determining whether the validation is successful. If not, act 512 can be performed. If so, act 514 can be performed. In various aspects, act 512 can include returning, by the central validation server, an unsuccessful validation message to the current computing service, without the current computing service invoking any of the one or more downstream computing services. In various cases, act 514 can include sending, by the central validation server, a successful validation message to the current computing service and handling, by the current computing service, the request by invoking the operational flow path and returning a result.

Again, computing time and/or computing resources can be saved by implemented centralized request validation as shown in FIG. 5. Since the computer-implemented method 500 involves checking not only the API validation requirements of a single computing service, but also checking the API validation requirements of downstream computing services, a greedy, fail fast request validation paradigm can be implemented.

Figure 6:
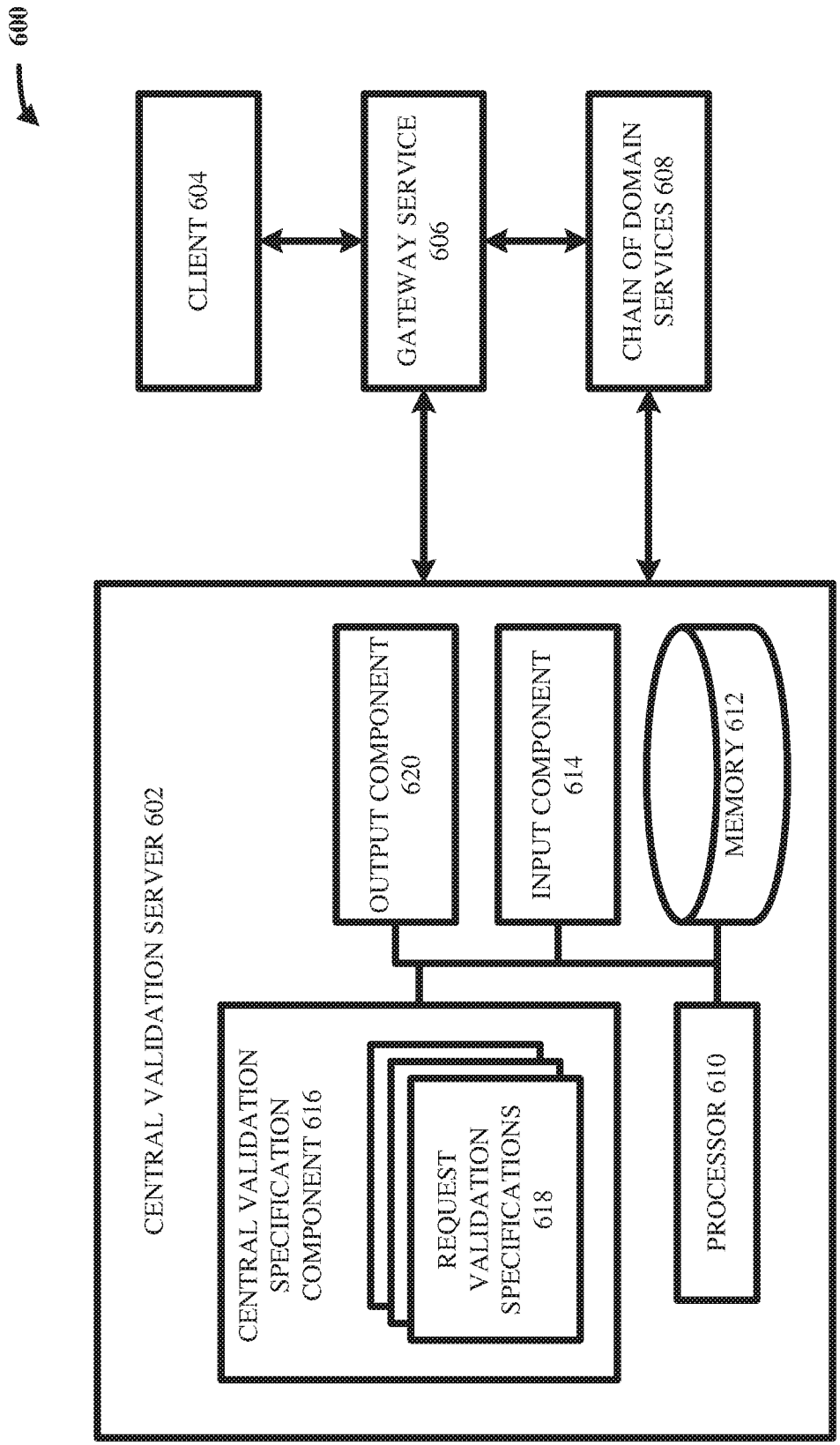
FIG. 6 illustrates a block diagram of an example, non-limiting system that facilitates centralized request validation in accordance with one or more embodiments described herein.

FIG. 6 illustrates a block diagram of an example, non-limiting system 600 that can facilitate centralized request validation in accordance with one or more embodiments described herein. As shown, a client 604 can be in electronic and/or digital communication (e.g., via any suitable wired and/or wireless connection) with a gateway service 606, and the gateway service 606 can be in electronic and/or digital communication (e.g., via any suitable wired and/or wireless connection) with a chain of domain services 608. In various aspects, the client 604 can send a computing request to the gateway service 606, and the computing request can be handleable and/or resolvable by the chain of domain services 608. In various aspects, the chain of domain services 608 can be organized into layers of domain services, with each layer comprising one or more domain services, with the one or more domain services in each layer being invocable and/or callable by at least one domain service in a preceding layer, and wherein the first layer is invocable and/or callable by the gateway service 606. In various instances, the system 600 can include more domain services (not shown) in addition to the chain of domain services 608. In various aspects, only the chain of domain services 608 can be needed to handle and/or resolve the computing request, and the additional domain services in the system 600 can be not required to handle and/or resolve the computing request.

As shown, a central validation server 602 can be in electronic and/or digital communication (e.g., via any suitable wired and/or wireless connection) with the gateway service 606 and/or with the chain of domain services 608. In various embodiments, the central validation server 602 can comprise a processor 610 (e.g., computer processing unit, microprocessor) and a computer-readable memory 612 that is operably and/or operatively and/or communicatively connected/coupled to the processor 610. The memory 612 can store computer-executable instructions which, upon execution by the processor 610, can cause the processor 610 and/or other components of the central validation server 602 (e.g., input component 614, central validation specification component 616, output component 620) to perform one or more acts. In various embodiments, the memory 612 can store computer-executable components (e.g., input component 614, central validation specification component 616, output component 620), and the processor 610 can execute the computer-executable components.

In various embodiments, the central validation server 602 can comprise an input component 614. In various aspects, the input component 614 can receive a validation instruction from the gateway service 606. In various cases, the validation instruction can be based on the computing request received by the gateway service 606 from the client 604. That is, in various aspects, the computing request can be handleable and/or resolvable and/or otherwise associated with the chain of domain services 608, and the validation instruction can indicate the identities of the chain of domain services 608 (e.g., can identify out of all the domain services in the system 600 only those domain services that are needed to handle and/or resolve the computing request). As explained above, any suitable statistical, mathematical, computer science, and/or machine learning technique can be used to identify the chain of domain services 608 based on the computing request (e.g., data and/or metadata contained in, pertaining to, and/or accompanying the computing request can be leveraged to infer and/or determine the identities of the domain services that are needed to handle and/or resolve the computing request). In various aspects, the gateway service 606 can derive the chain of domain services 608 based on the computing request and can indicate in the validation instruction the identities of the chain of domain services 608. In some cases, machine learning and/or artificial intelligence can be used to derive (e.g., identify) the chain of domain services 608.

To facilitate some of the above-described machine learning aspects of various embodiments of the subject innovation, consider the following discussion of artificial intelligence. Various embodiments of the present innovation herein can employ artificial intelligence (AI) to facilitate automating one or more features of the present innovation. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) of the present innovation, components of the present innovation can examine the entirety or a subset of the data to which it is granted access and can provide for reasoning about or determine states of the system and/or environment from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

A classifier can map an input attribute vector, $z=(z1, z2, z3, z4, zn)$, to a confidence that the input belongs to a class, as by $f(z)=confidence(class)$. Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

In various embodiments, the central validation server 602 can comprise a central validation specification component 616. In various aspects, the central validation specification component 616 can store and/or maintain request validation specifications 618. In various instances, the central validation server 602 can be implemented in a given service-oriented computing system, and each computing service (e.g., gateway and/or domain) in the given service-oriented computing system can have a corresponding request validation specification, all of which can be included, in various instances, in the request validation specifications 618. Since the system 600 can include the gateway service 606, the chain of domain services 608, and one or more other domain services that are not needed to handle and/or resolve the computing request from the client 604, the request validation specifications 618 can comprise a request validation specification corresponding to the gateway service 606, can comprise request validation specifications respectively corresponding to the chain of domain services 608, and can comprise one or more other request validation specifications respectively corresponding to the one or more other domain services that are needed to handle and/or resolve the computing request.

In various embodiments, the central validation server 602 can comprise an output component 620. In various instances, the output component 620 can respond to the validation instruction received by the input component 614 from the gateway service 606. In some embodiments, the output component 620 can respond to the validation instruction from the gateway service 606 by transmitting to the gateway service 606 a subset of the request validation specifications 618. In various cases, the subset of the request validation specifications 618 can include the request validation specification corresponding to the gateway service 606 and can include the request validation specifications respectively corresponding to the chain of domain services 608 (e.g., can include the request validation specifications of the downstream domain services that are needed to handle and/or resolve the computing request). In various aspects, the subset of the request validation specifications 618 can omit the one or more other request validation specifications respectively corresponding to the one or more other domain services that are not needed to handle and/or resolve the computing request. In various instances, the gateway service 606 can accordingly validate the computing request based on the subset of the request validation specifications 618 (e.g., based on the request validation specifications that are transmitted to the gateway service 606 by the output component 620). In various aspects, the gateway service 606 can determine that the computing request fails to satisfy at least one of the subset of request validation specifications 618. The gateway service 606 can accordingly generate and transmit to the client 102 an appropriate error message (e.g., 4xx, 5xx), without invoking the chain of domain services 608. In some instances, the gateway service 606 can determine that the computing request fails to provide at least one data element that is specified as mandatory in at least one of the subset of request validation specifications. In various instances, the gateway service 606 can prompt the client 604 for a valid and/or compliant request. In various aspects, the gateway service 606 can determine that the computing request satisfies the subset of the request validation specifications 618. Accordingly, the gateway service 606 can invoke the chain of domain services 608 and can return a consolidated result to the client 604.

In various embodiments, the output component 620 can respond to the validation instruction from the gateway service 606 by validating the computing request. In such embodiments, the validation instruction sent from the gateway service 606 to the input component 614 can be a publication of the computing request. In various aspects, the output component 620 can derive the chain of domain services 608 based on the validation instruction (e.g., based on the published computing request). In other words, the output component 620 can, in some cases, determine the identities of the chain of domain services 608 (e.g., can determine which downstream domain services are needed to handle and/or resolve the published computing request). Accordingly, the output component 620 can identify the subset of request validation specifications 618 and can validate the computing request based on the subset of the request validation specifications 618. In various cases, the output component 620 can determine that the computing request fails to satisfy at least one of the subset of the request validation specifications 618. In such cases, the output component 620 can generate and transmit to the gateway service 606 an error message (e.g., 4xx, 5xx, and/or any other suitable unsuccessful validation message). In various instances, the gateway service 606 can relay the error message to the client 604 without invoking the chain of domain services 608. In various aspects, the gateway service 606 can prompt the client 604 for a compliant and/or valid computing request. In various aspects, the output component 620 can determine that the computing request satisfies the subset of the request validation specifications 618. Accordingly, the output component 620 can transmit a successful validation message to the gateway service 606, and the gateway service 606 can invoke the chain of domain services 608 and can return a consolidated result to the client 604.

In various aspects, since the request validation specifications 618 can be stored and/or maintained in a single, centralized location (e.g., stored in the central validation server 602), updates to the request validation specifications 618 can be facilitated without individually pushing the updates at the service level. For example, in various cases, any desired updates can simply be pushed to the central validation specification component 616 of the central validation server 602, rather than individually and/or independently pushing each update to its corresponding domain service and/or gateway service. In various aspects, such unified control over request validation specification updates can be easier and more efficient than pushing individual service-level updates. In various aspects, the gateway service 606 and/or the chain of domain services 608 can periodically and/or aperiodically check the central validation server 602 for updated versions of the request validation specifications 618. In some cases, the central validation server 602 can, via the output component 620, periodically and/or aperiodically push updates to the gateway service 606 and/or to any domain service in the chain of domain services 608 (e.g., when the central validation specification component 616 receives updates to the request validation specifications 618, the output component 620 can push such updates to the gateway service 606 and/or to the chain of domain services 608).

Figure 7:
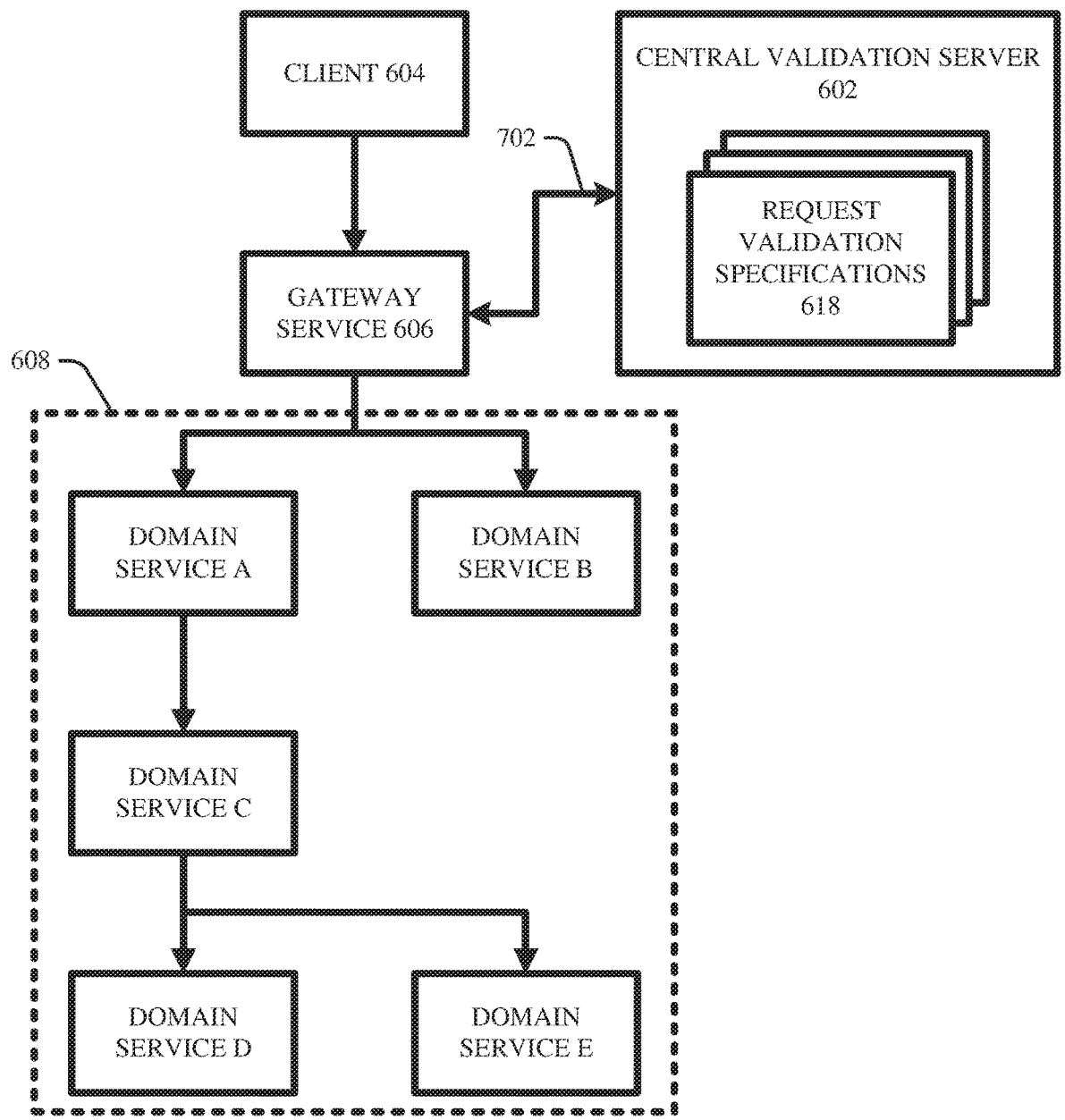
FIG. 7 illustrates a block diagram of an example, non-limiting system that facilitates centralized request validation by a gateway service in accordance with one or more embodiments described herein.

FIG. 7 illustrates a block diagram of an example, non-limiting system 700 that can facilitate centralized request validation by a gateway service in accordance with one or more embodiments described herein. In other words, FIG. 7 illustrates an exemplary arrangement of the system 600 in which the gateway service 606 sends a validation instruction to the central validation server 602.

In the example shown in FIG. 7, the chain of domain services 608 comprises a three-layer operational flow of domain services. The first layer includes the domain service A and the domain service B, which can be invoked by the gateway service 606. The second layer includes the domain service C, which can be invoked by the domain service A. The third layer includes the domain service D and the domain service E, which can be invoked by the domain service C. In other words, the computing request sent from the client 604 to the gateway service 606 can be handleable and/or resolvable by invocation of the domain service A and the domain service B by the gateway service 606, by invocation of the domain service C by the domain service A, and by invocation of the domain service D and the domain service E by the domain service C. Although only five domain services are depicted in FIG. 7, this is non-limiting and for illustration only. In various embodiments, any suitable number of domain services can be implemented in any suitable arrangement (e.g., any suitable number and/or sizes of layers in the operational flow path).

In various embodiments, the gateway service 606 can transmit to the central validation server 602 a validation instruction (e.g., via electronic communication 702). The validation instruction can indicate the operational flow path downstream of the gateway service 606 that is needed to handle the computing request (e.g., can indicate the identities of the domain services A, B, C, D, and E). As explained above, the central validation server 602 can store the request validation specifications 618. In various instances, a subset of the request validation specifications 618 can include a request validation specification corresponding to the gateway service 606 and can include request validation specifications respectively corresponding to the chain of domain services 608 (e.g., corresponding to the domain services A, B, C, D, and E). In various aspects, the central validation server 602 can transmit, in response to the validation instruction, the subset of the request validation specifications 618 to the gateway service 606. Accordingly, the gateway service 606 can, in some embodiments, validate the computing request based on the subset of the request validation specifications 618 transmitted by the central validation server 602.

In various other embodiments, the gateway service 606 can transmit to the central validation server 602 a validation instruction (e.g., via electronic communication 702). The validation instruction, in some cases, can be a publication of the computing request received by the gateway service 606 from the client 604. In various aspects, the central validation server 602 can derive, as described above, the chain of domain services 608 from the validation instruction (e.g., the central validation server 602 can determine and/or infer that the domain services A, B, C, D, and E are needed to handle and/or resolve the computing request received by the gateway service 606). As explained above, the central validation server 602 can store the request validation specifications 618. In various instances, a subset of the request validation specifications 618 can include a request validation specification corresponding to the gateway service 606 and can include request validation specifications respectively corresponding to the chain of domain services 608 (e.g., corresponding to the domain services A, B, C, D, and E). In various aspects, the central validation server 602 can validate, in response to the validation instruction, the computing request based on the subset of the request validation specifications 618. Accordingly, the central validation server 602 can transmit a successful and/or unsuccessful validation message to gateway service 606, and the gateway service 606 can respond accordingly (e.g., invoking the chain of domain services 608 and/or relaying an unsuccessful validation message to the client 604).

Figure 8:
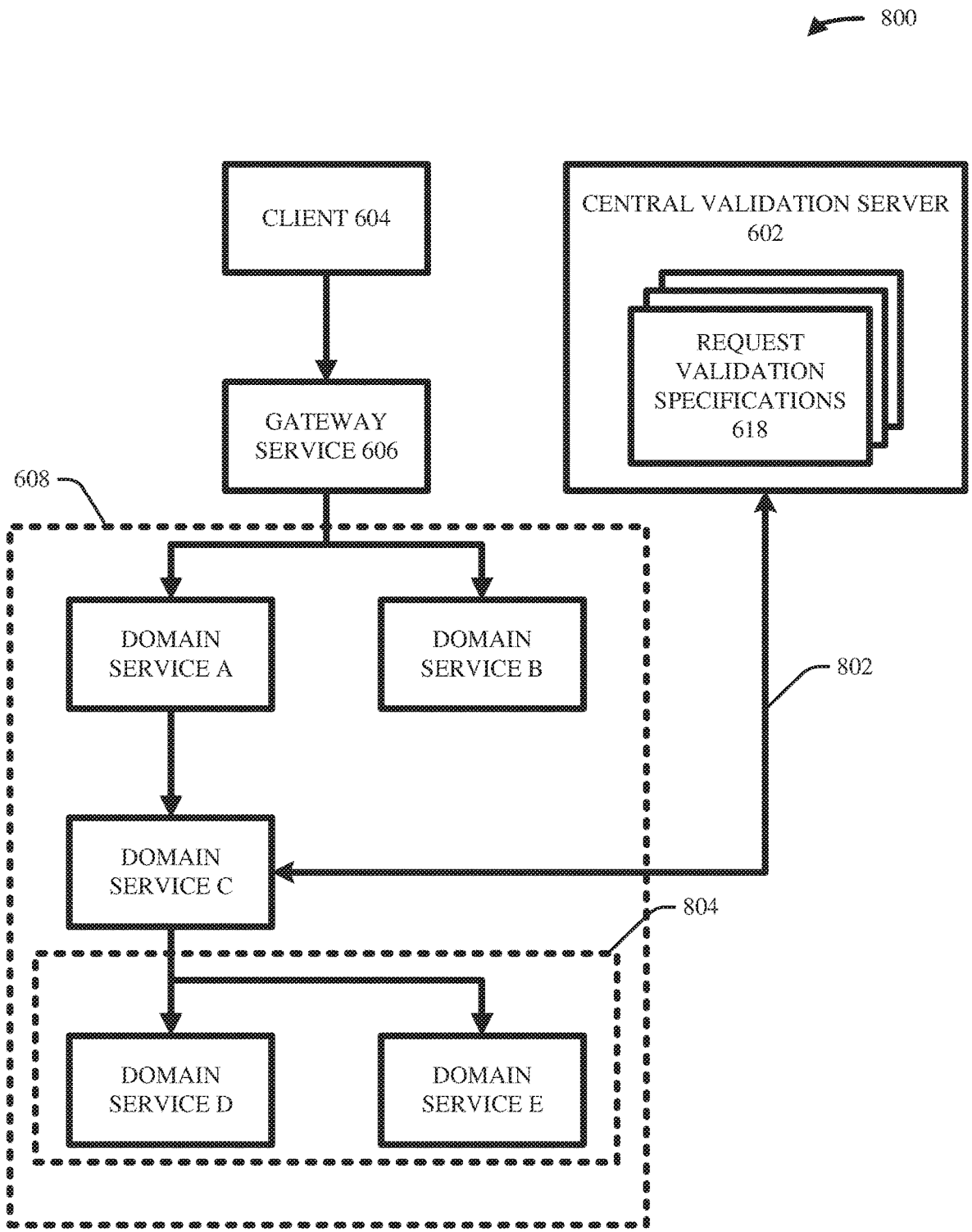
FIG. 8 illustrates a block diagram of an example, non-limiting system that facilitates centralized request validation by a domain service in accordance with one or more embodiments described herein.

FIG. 8 illustrates a block diagram of an example, non-limiting system 800 that can facilitate centralized request validation by a domain service in accordance with one or more embodiments described herein. In other words, FIG. 8 illustrates an exemplary arrangement of the system 600 in which one of the chain of domain services 608 sends a validation instruction to the central validation server 602.

In the example shown in FIG. 8, the chain of domain services 608 comprises the three-layer operational flow of domain services described above in connection with FIG. 7 (e.g., domain services A, B, C, D, and E).

In various embodiments, one or more domain services of the chain of domain services 608 can be configured and/or designed to populate and/or otherwise provide supplemental data to the computing request (e.g., a domain service can obtain supplemental data corresponding to the client 604 from one or more queriable databases and/or data structures—not shown). In such cases, the computing request can be not expected/required to provide such supplemental data. In various cases, once populated, that supplemental data can be considered part of the computing request and can be validated and/or used by computing services downstream of the service that populates the supplemental data.

For example, suppose that the computing request from the client 604 lacks a particular data element which is mandatory on domain services C, D, and E, but not mandatory on domain services A and B or on the gateway service 606. Moreover, suppose that the computing request otherwise satisfies the validation requirements of the gateway service 606 and the chain of domain services 608. Furthermore, suppose that the domain service A is configured to populate that particular data element. In such case, the client 604 can not be expected/required to provide that particular data element in the computing request. So, the gateway service 606 and/or the central validation server 602 can validate the computing request, as described above. Accordingly, the gateway service 606 can invoke the domain service A and the domain service B, which can also validate the computing request as described above. Once invoked, the domain service A can populate the particular data element and then invoke the domain service C.

Suppose that the domain service A erroneously populates the particular data element, such that the particular data element satisfies the validation requirements of the domain services C and D, but does not satisfy the validation requirements of the domain service E. In such case, the domain service C can derive a chain of domain services 804 that are downstream of the domain service C and that are needed to handle and/or resolve the computing request received by the domain service C from the domain service A (e.g., with the populated data element). In various aspects, the domain service C can transmit to the central validation server 602 a validation instruction (e.g., via electronic communication 802). The validation instruction can indicate the operational flow path downstream of the domain service C that is needed to handle the computing request (e.g., can indicate the identities of the domain services D and E). As explained above, the central validation server 602 can store the request validation specifications 618. In various instances, a subset of the request validation specifications 618 can include a request validation specification corresponding to the domain service C and can include request validation specifications respectively corresponding to the chain of domain services 804 (e.g., corresponding to the domain services D and E). In various aspects, the central validation server 602 can transmit, in response to the validation instruction, the subset of the request validation specifications 618 to the domain service C. Accordingly, the domain service C can, in some embodiments, validate the computing request from service A (e.g., with the populated data element) based on the subset of the request validation specifications 618 transmitted by the central validation server 602. Since the particular data element was erroneously populated, the domain service C can determine that the computing request with the populated data element does not satisfy the request validation specification of the domain service E. Accordingly, the domain service C can generate an error message (e.g., 4xx, 5xx) and relay that error message to the domain service A, without invoking the chain of domain services 804 (e.g., without invoking the domain service D or the domain service E).

In various other embodiments, the domain service C can transmit to the central validation server 602 a validation instruction (e.g., via electronic communication 802). The validation instruction, in some cases, can be a publication of the computing request received by the domain service C from the domain service A (e.g., containing the populated data element). In various aspects, the central validation server 602 can derive, as described above, the chain of domain services 804 from the validation instruction (e.g., the central validation server 602 can determine and/or infer that the domain services D and E are needed to handle and/or resolve the computing request received by the domain service C). As explained above, the central validation server 602 can store the request validation specifications 618. In various instances, a subset of the request validation specifications 618 can include a request validation specification corresponding to the domain service C and can include request validation specifications respectively corresponding to the chain of domain services 804 (e.g., corresponding to the domain services D and E). In various aspects, the central validation server 602 can validate, in response to the validation instruction, the computing request based on the subset of the request validation specifications 618. Accordingly, the central validation server 602 can transmit a successful and/or unsuccessful validation message to domain service C, and the domain service C can respond accordingly (e.g., invoking the chain of domain services 804 and/or relaying an unsuccessful validation message to the domain service A).

Figure 9:
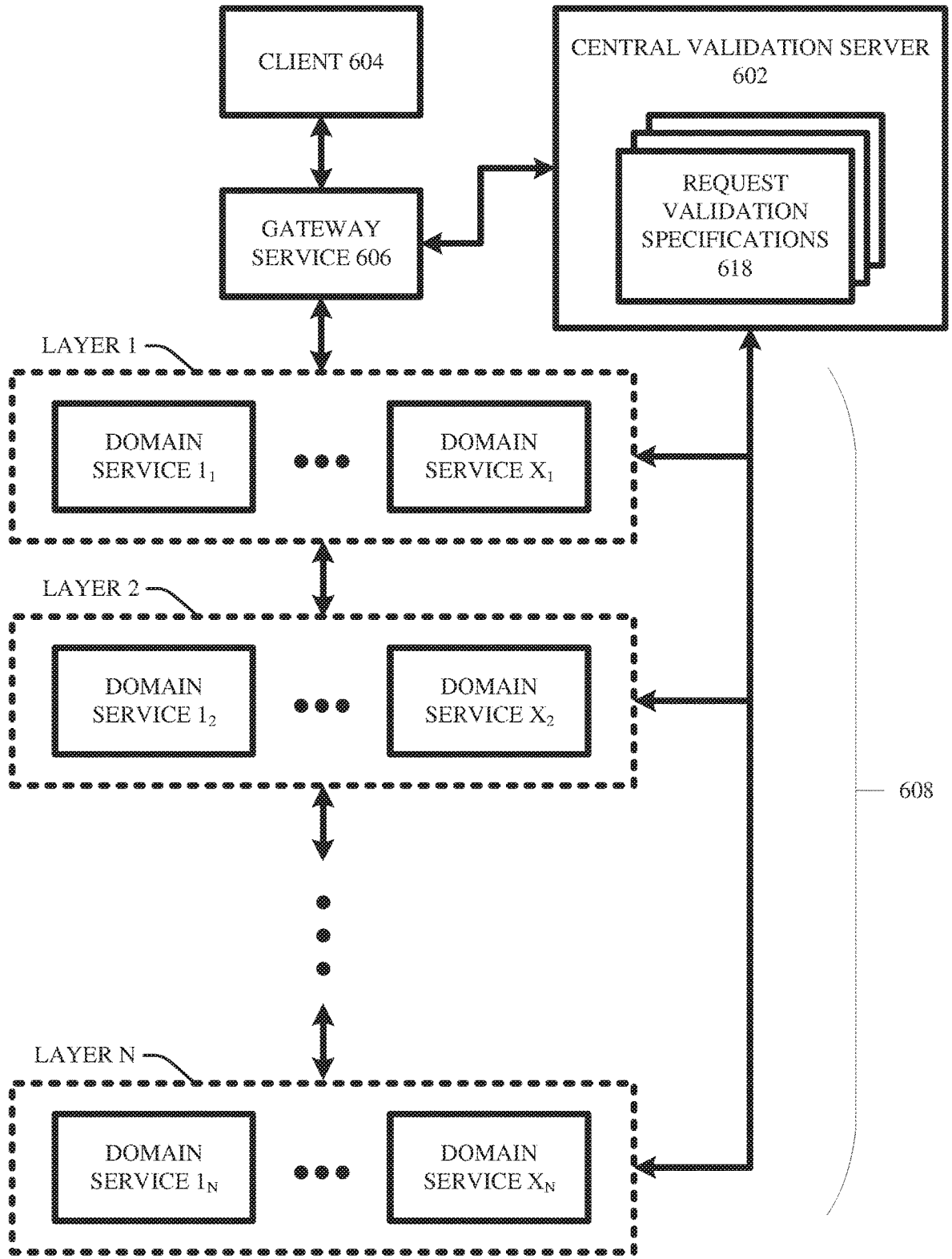
FIG. 9 illustrates a block diagram of an example, non-limiting system that facilitates centralized request validation in accordance with one or more embodiments described herein.

FIG. 9 illustrates a block diagram of an example, non-limiting system 900 that can facilitate centralized request validation in accordance with one or more embodiments described herein.

As mentioned above, in some embodiments, the chain of domain services 608 can be considered a multi-layered operational flow of domain services. As shown, in various embodiments, the chain of domain services 608 can comprise N layers, for any suitable integer N. In various instances, each layer can comprise one or more domain services. For instance, as illustrated, layer 1 can comprise $X_1$ domain services for any suitable integer $X_1$, layer 2 can comprise $X_2$ domain services for any suitable integer $X_2$, and layer N can comprise $X_N$ domain services for any suitable integer $X_N$. In various aspects, the one or more domain services in layer 1 can be invocable and/or callable by the gateway service 606, the one or more domain services in layer 2 can be invocable and/or callable by at least one domain service in layer 1, the one or more domain services in layer N can be invocable and/or callable by at least one domain service in layer N−1, and so on. In various instances, the central validation server 602 can be communicatively coupled to the gateway service 606 and/or to each of the domain services in each of the layers of the chain of domain services 608.

In various instances, the central validation server 602 can receive a validation instruction from the gateway service 606 and can transmit an appropriate subset of the request validation specifications 618 to the gateway service 606, as described above. In various other instances, the central validation server 602 can receive a validation instruction from any suitable domain service in any suitable layer of the chain of domain services 608 and can transmit an appropriate subset of the request validation specifications 618 to the suitable domain service of the suitable layer in the chain of domain services 608.

In various aspects, the central validation server 602 can receive a validation instruction from any suitable computing service (e.g., gateway and/or domain), where the validation instruction identifies a chain of computing services that are downstream of the suitable computing service and that are needed to handle and/or resolve a computing request (e.g., if the suitable computing service is in layer N−M for any suitable integer M<N, then the validation instruction can identify all of the computing services from layer N−M+1 to layer N, which can represent the computing services downstream of the suitable computing service). In various cases, the central validation server 602 can transmit to the suitable computing service a subset of the request validation specifications 618 respectively corresponding to the downstream computing services. In various instances, the suitable computing service can perform a request validation based on the subset of the request validation specifications 618.

In various other embodiments, any suitable computing service can publish to the central validation server 602 a computing request. In various instances, the central validation server can identify a chain of computing services that are downstream of the suitable computing service and that are needed to handle and/or resolve the computing request. In various aspects, the central validation server 602 can validate the computing request based on a subset of the request validation specifications 618 respectively corresponding to the chain of downstream services. In various instances, the central validation server 602 can transmit a corresponding validation message (e.g., successful or unsuccessful) to the suitable computing service.

Figure 10:
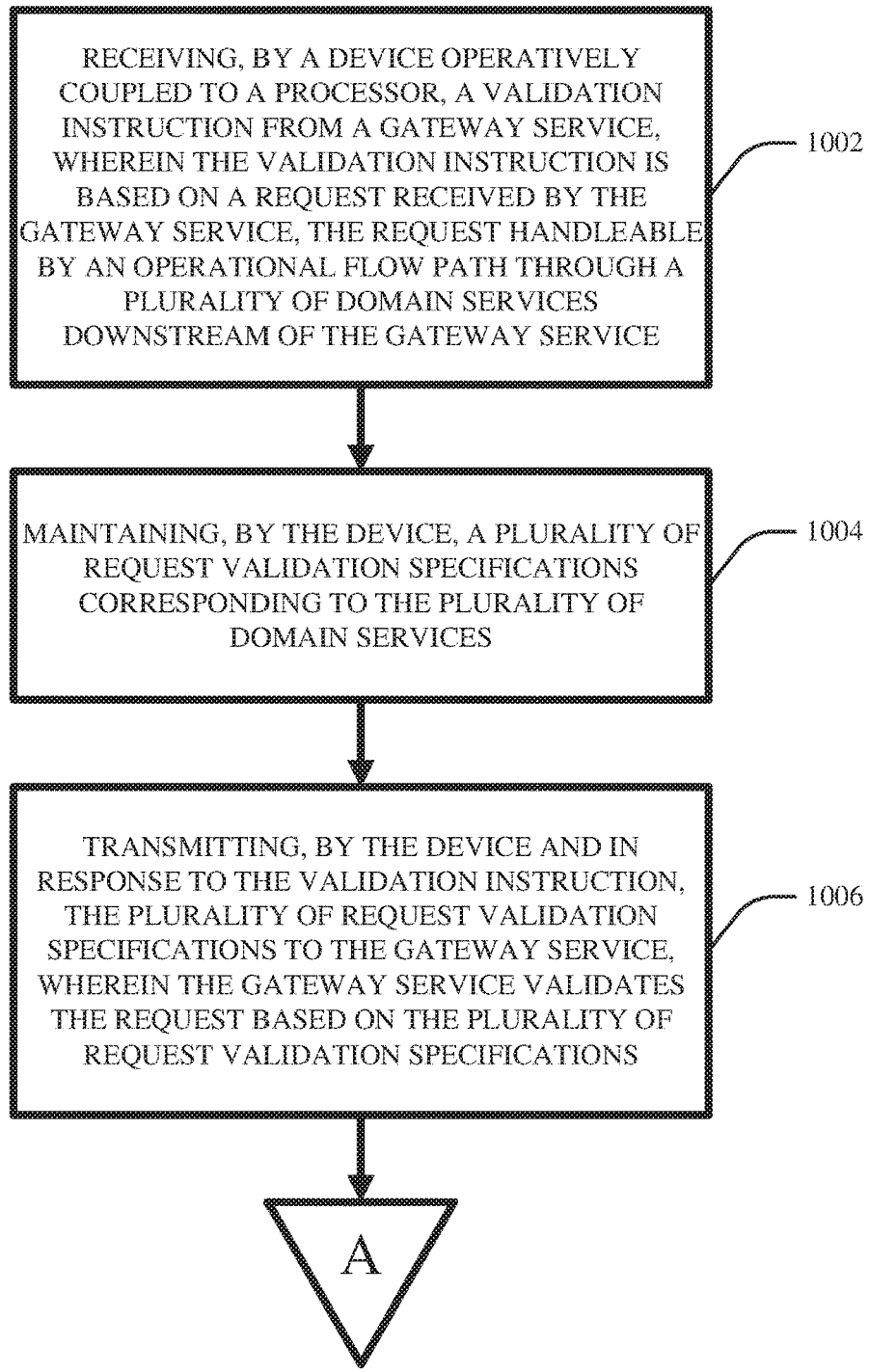
FIG. 10 illustrates a flow diagram of an example, non-limiting computer-implemented method that facilitates centralized request validation by a gateway service in accordance with one or more embodiments described herein.

FIG. 10 illustrates a flow diagram of an example, non-limiting computer-implemented method 1000 that can facilitate centralized request validation by a gateway service in accordance with one or more embodiments described herein.

In various embodiments, act 1002 can include receiving, by a device operatively coupled to a processor (e.g., 614), a validation instruction from a gateway service (e.g., 606), wherein the validation instruction is based on a request received by the gateway service, the request handleable by an operational flow path through a plurality of domain services downstream of the gateway service (e.g., 608).

In various aspects, act 1004 can include maintaining, by the device (e.g., 616), a plurality of request validation specifications (e.g., 618) corresponding to the plurality of domain services.

In various instances, act 1006 can include transmitting, by the device (e.g., 620) and in response to the validation instruction, the plurality of request validation specifications to the gateway service, wherein the gateway service validates the request based on the plurality of request validation specifications.

Figure 11:
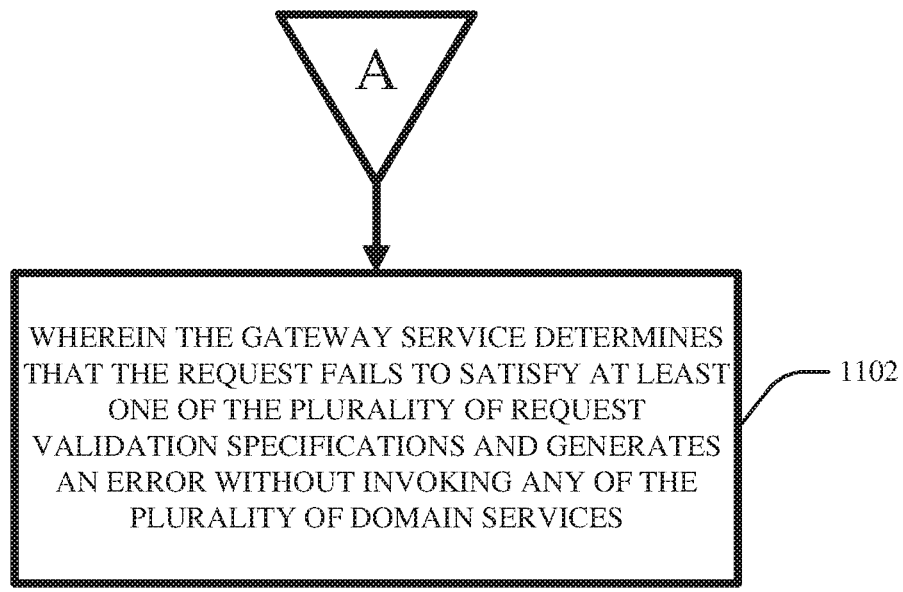
FIG. 11 illustrates a flow diagram of an example, non-limiting computer-implemented method that facilitates centralized request validation by a gateway service in accordance with one or more embodiments described herein.

FIG. 11 illustrates a flow diagram of an example, non-limiting computer-implemented method 1100 that can facilitate centralized request validation by a gateway service in accordance with one or more embodiments described herein. As shown, the computer-implemented method 1100 can, in some cases, comprise the same acts as the computer-implemented method 1000, and can further comprise act 1102.

In various embodiments, act 1102 can include wherein the gateway service determines that the request fails to satisfy at least one of the plurality of request validation specifications (e.g., domain service E of FIG. 7) and generates an error without invoking any of the plurality of domain services.

Figure 12:
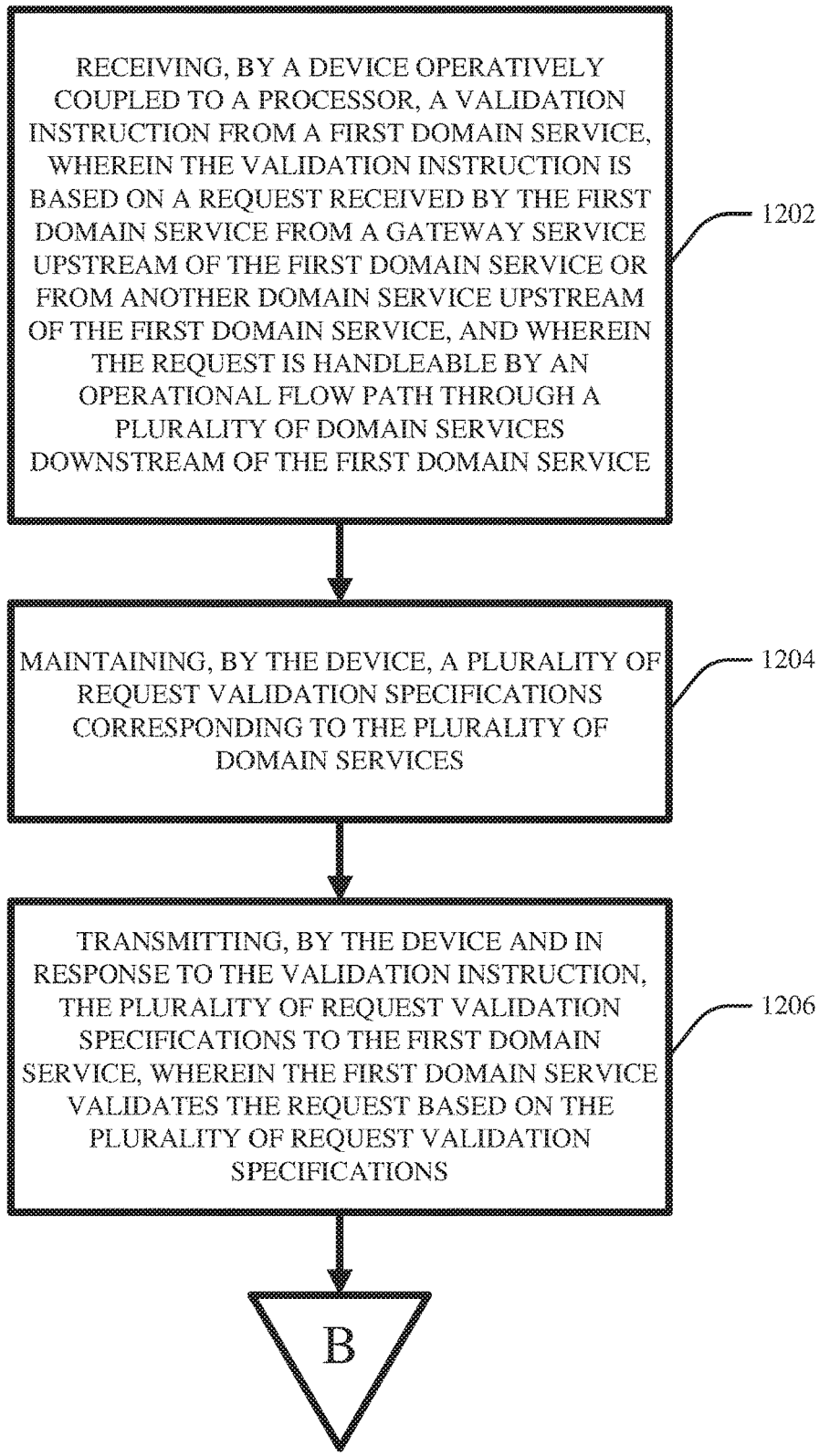
FIG. 12 illustrates a flow diagram of an example, non-limiting computer-implemented method that facilitates centralized request validation by a domain service in accordance with one or more embodiments described herein.

FIG. 12 illustrates a flow diagram of an example, non-limiting computer-implemented method 1200 that can facilitate centralized request validation by a domain service in accordance with one or more embodiments described herein.

In various embodiments, act 1202 can include receiving, by a device operatively coupled to a processor (e.g., 614), a validation instruction from a first domain service (e.g., domain service C in FIG. 8), wherein the validation instruction is based on a request received by the first domain service from a gateway service upstream of the first domain service (e.g., 606) or from another domain service upstream of the first domain service (e.g., domain service A in FIG. 8). In various cases, the request can be handleable by an operational flow path through a plurality of domain services downstream of the first domain service (e.g., 804).

In various aspects, act 1204 can include maintaining, by the device (e.g., 616), a plurality of request validation specifications corresponding to the plurality of domain services (e.g., 618).

In various instances, act 1206 can include transmitting, by the device (e.g., 620) and in response to the validation instruction, the plurality of request validation specifications to the first domain service, wherein the first domain service validates the request based on the plurality of request validation specifications.

Figure 13:
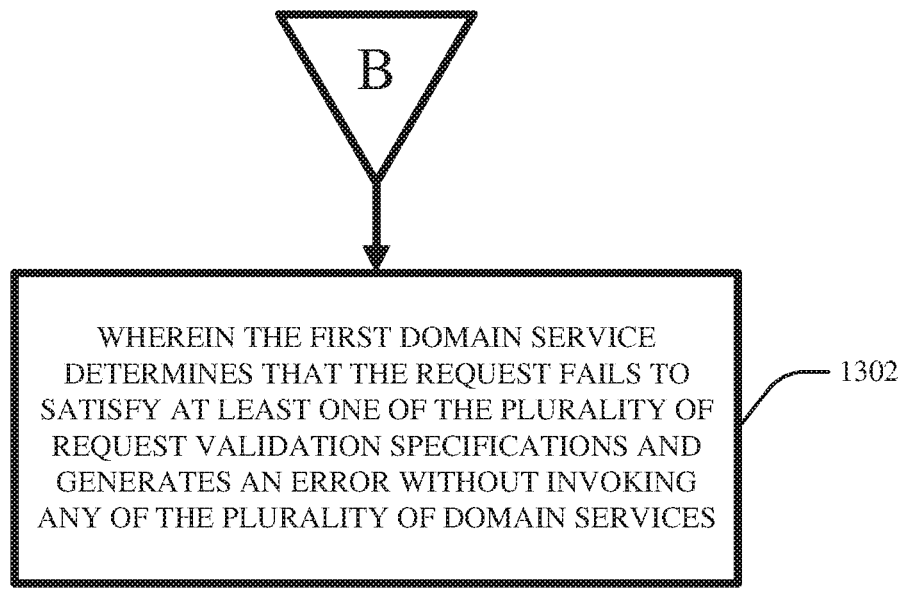
FIG. 13 illustrates a flow diagram of an example, non-limiting computer-implemented method that facilitates centralized request validation by a domain service in accordance with one or more embodiments described herein.

FIG. 13 illustrates a flow diagram of an example, non-limiting computer-implemented method 1300 that can facilitate centralized request validation by a domain service in accordance with one or more embodiments described herein. As shown, the computer-implemented method 1300 can, in some cases, comprise the same acts as the computer-implemented method 1200, and can further comprise act 1302.

In various embodiments, act 1302 can include wherein the first domain service determines that the request fails to satisfy at least one of the plurality of request validation specifications (e.g., domain service E in FIG. 8) and generates an error without invoking any of the plurality of domain services.

Figure 14:
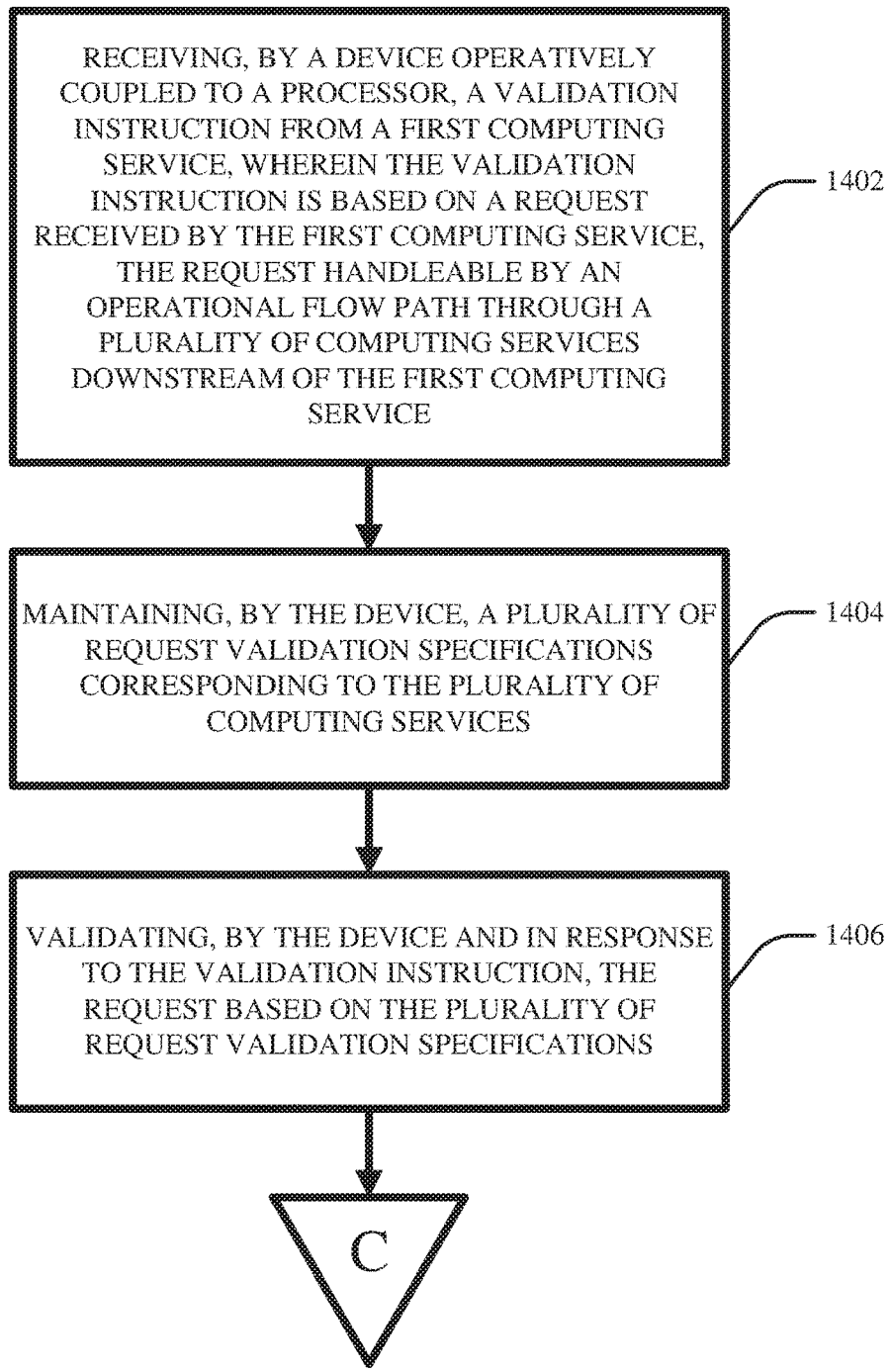
FIG. 14 illustrates a flow diagram of an example, non-limiting computer-implemented method that facilitates centralized request validation by a central validation server in accordance with one or more embodiments described herein.

FIG. 14 illustrates a flow diagram of an example, non-limiting computer-implemented method 1400 that can facilitate centralized request validation by a central validation server in accordance with one or more embodiments described herein.

In various embodiments, act 1402 can include receiving, by a device operatively coupled to a processor (e.g., 614), a validation instruction from a first computing service (e.g., 606, and/or domain service C in FIG. 8), wherein the validation instruction is based on a request received by the first computing service, the request handleable by an operational flow path through a plurality of computing services downstream of the first computing service (e.g., 608, and/or 804 in FIG. 8).

In various aspects, act 1404 can include maintaining, by the device (e.g., 616), a plurality of request validation specifications (e.g., 618) corresponding to the plurality of computing services.

In various instances, act 1406 can include validating, by the device (e.g., 620) and in response to the validation instruction, the request based on the plurality of request validation specifications.

Figure 15:
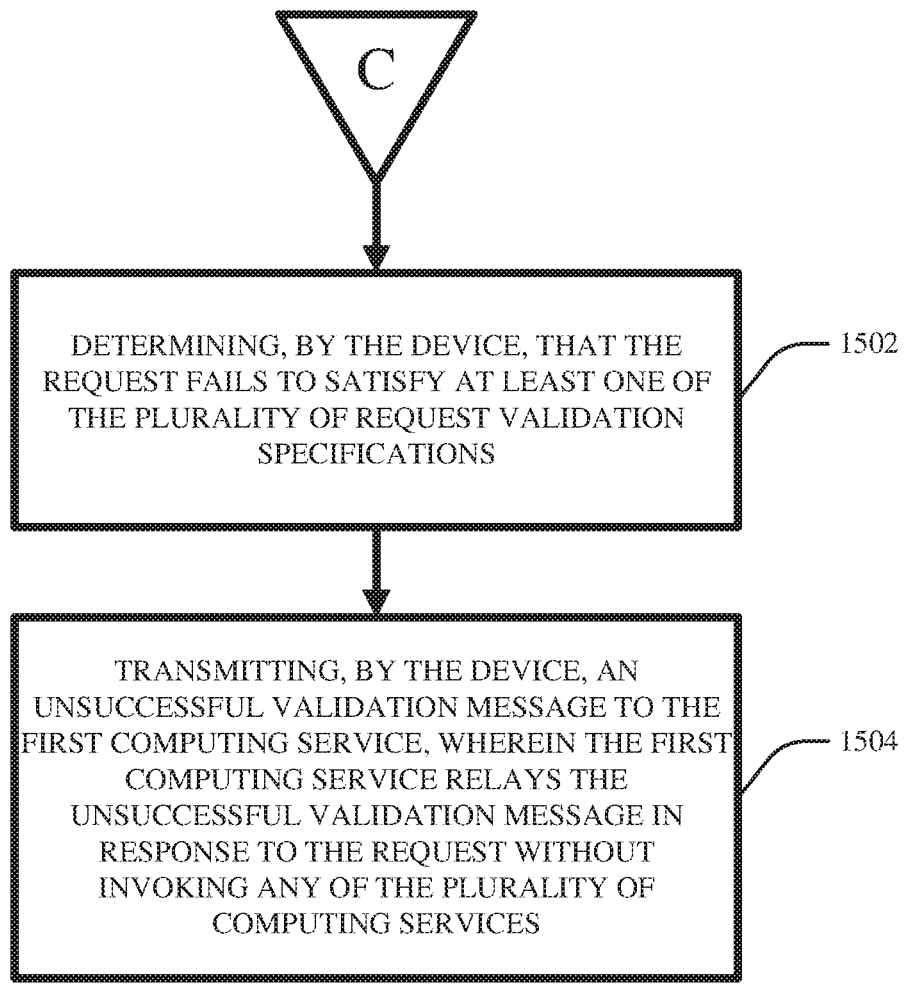
FIG. 15 illustrates a flow diagram of an example, non-limiting computer-implemented method that facilitates centralized request validation by a central validation server in accordance with one or more embodiments described herein.

FIG. 15 illustrates a flow diagram of an example, non-limiting computer-implemented method 1500 that can facilitate centralized request validation by a central validation server in accordance with one or more embodiments described herein. As shown, the computer-implemented method 1500 can, in some cases, comprise the same acts as the computer-implemented method 1400, and can further comprise acts 1502 and 1504.

In various instances, act 1502 can include determining, by the device (e.g., 620), that the request fails to satisfy at least one of the plurality of request validation specifications.

In various aspects, act 1504 can include transmitting, by the device (e.g., 620), an unsuccessful validation message to the first computing service, wherein the first computing service relays the unsuccessful validation message in response to the request without invoking any of the plurality of computing services.

In various embodiments, the subject innovation can involve detaching request validation logic from a computing service in a service-oriented architecture and centralizing/federalizing it. In various aspects, a centralized configuration and/or document server (e.g., the central validation server) can host the validation logic (e.g., the request validation specifications). In various aspects, a user interface can be provided to feed JSON spec, XML spec, sample JSON or XML requests, and/or any other form of input to a request validation builder service which can build a basic template from the input provided. This can, in some cases, let the operators define the logic for flow identification and derive new templates from existing templates to customize request validation per-flow or based on any other suitable criteria. In various aspects, a library can be provided that can fetch the request validators from the centralized server and cache it. In some cases, the library can intercept the incoming request from a gateway and/or domain service, identify the flow, fetch the validator, and run it. In various instances, a gateway and/or domain service can publish a request to a messaging and/or streaming service (e.g., kafka). In such cases, a daemon can consume the publication, validate the request, and publish the result. In various aspects, request validation can be invoked from gateway service and/or domain services to advance validation. In various instances, centralized request validation can be performed while waiting for dependent services and/or tasks that are in progress. In various instances, request validation specifications can be configured in a centralized request validation server, and a gateway service can invoke the request validation in parallel using the library and can take actions based on the responses provided by the library. In some cases, domain services that are invoked directly can perform the request validation in a similar way. In various embodiments, embodiments of the innovation can be integrated with PPAAS & Raptor to enforce request validation.

Figure 16:
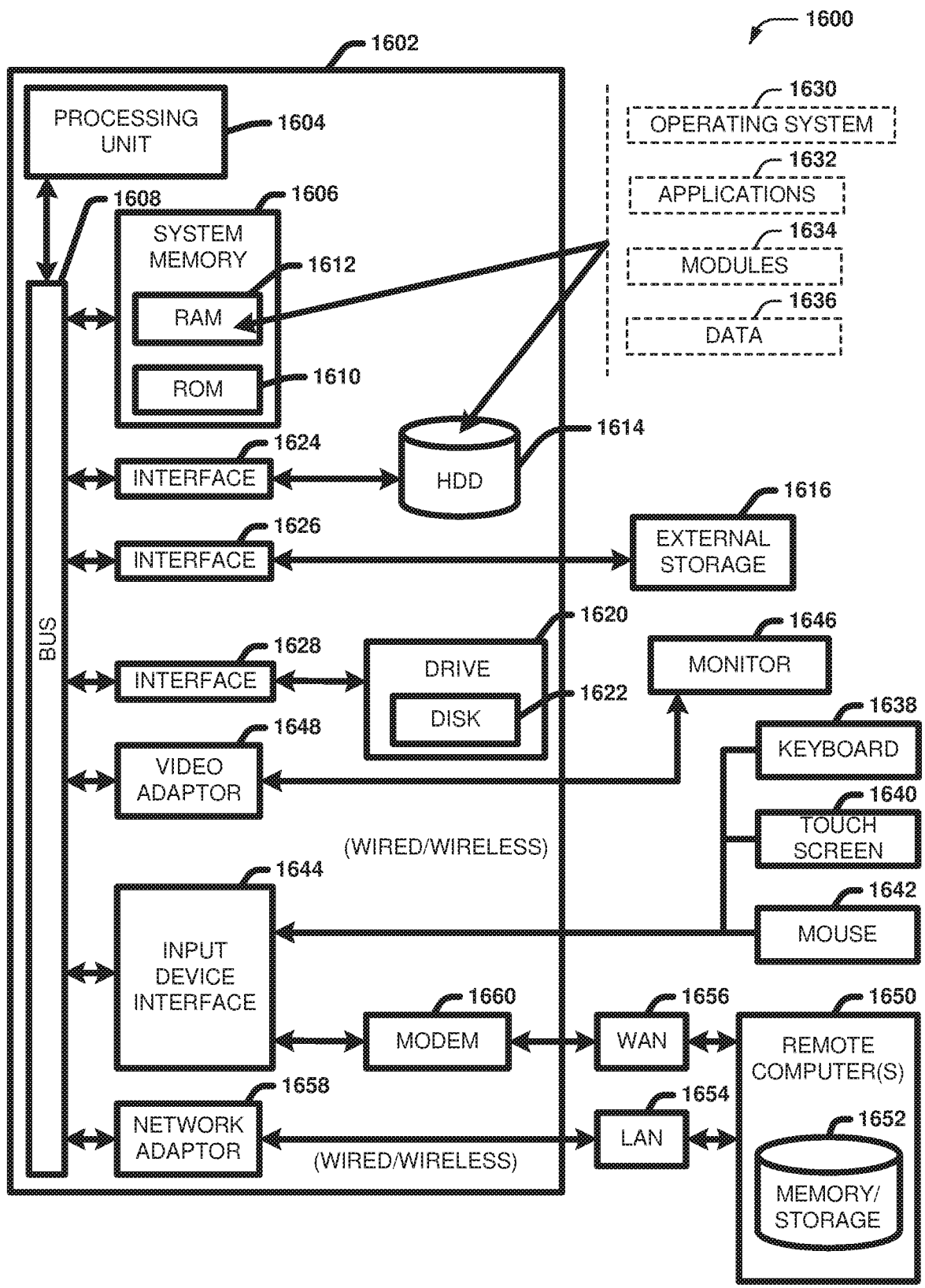
FIG. 16 illustrates a block diagram of an example, non-limiting operating environment in which one or more embodiments described herein can be facilitated.

In order to provide additional context for various embodiments described herein, FIG. 16 and the following discussion are intended to provide a brief, general description of a suitable computing environment 1600 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 16, the example environment 1600 for implementing various embodiments of the aspects described herein includes a computer 1602, the computer 1602 including a processing unit 1604, a system memory 1606 and a system bus 1608. The system bus 1608 couples system components including, but not limited to, the system memory 1606 to the processing unit 1604. The processing unit 1604 can be any of various commercially available processors. Dual microprocessors and other multi-processor architectures can also be employed as the processing unit 1604.

The system bus 1608 can be any of several types of bus structure that can further interconnect to a memory bus (with or without a memory controller), a peripheral bus, and a local bus using any of a variety of commercially available bus architectures. The system memory 1606 includes ROM 1610 and RAM 1612. A basic input/output system (BIOS) can be stored in a non-volatile memory such as ROM, erasable programmable read only memory (EPROM), EEPROM, which BIOS contains the basic routines that help to transfer information between elements within the computer 1602, such as during startup. The RAM 1612 can also include a high-speed RAM such as static RAM for caching data.

The computer 1602 further includes an internal hard disk drive (HDD) 1614 (e.g., EIDE, SATA), one or more external storage devices 1616 (e.g., a magnetic floppy disk drive (FDD) 1616, a memory stick or flash drive reader, a memory card reader, etc.) and a drive 1620, e.g., such as a solid state drive, an optical disk drive, which can read or write from a disk 1622, such as a CD-ROM disc, a DVD, a BD, etc. Alternatively, where a solid state drive is involved, disk 1622 would not be included, unless separate. While the internal HDD 1614 is illustrated as located within the computer 1602, the internal HDD 1614 can also be configured for external use in a suitable chassis (not shown). Additionally, while not shown in environment 1600, a solid state drive (SSD) could be used in addition to, or in place of, an HDD 1614. The HDD 1614, external storage device(s) 1616 and drive 1620 can be connected to the system bus 1608 by an HDD interface 1624, an external storage interface 1626 and a drive interface 1628, respectively. The interface 1624 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1602, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1612, including an operating system 1630, one or more application programs 1632, other program modules 1634 and program data 1636. All or portions of the operating system, applications, modules, and/or data can also be cached in the RAM 1612. The systems and methods described herein can be implemented utilizing various commercially available operating systems or combinations of operating systems.

Computer 1602 can optionally comprise emulation technologies. For example, a hypervisor (not shown) or other intermediary can emulate a hardware environment for operating system 1630, and the emulated hardware can optionally be different from the hardware illustrated in FIG. 16. In such an embodiment, operating system 1630 can comprise one virtual machine (VM) of multiple VMs hosted at computer 1602. Furthermore, operating system 1630 can provide runtime environments, such as the Java runtime environment or the .NET framework, for applications 1632. Runtime environments are consistent execution environments that allow applications 1632 to run on any operating system that includes the runtime environment. Similarly, operating system 1630 can support containers, and applications 1632 can be in the form of containers, which are lightweight, standalone, executable packages of software that include, e.g., code, runtime, system tools, system libraries and settings for an application.

Further, computer 1602 can be enabled with a security module, such as a trusted processing module (TPM). For instance with a TPM, boot components hash next in time boot components, and wait for a match of results to secured values, before loading a next boot component. This process can take place at any layer in the code execution stack of computer 1602, e.g., applied at the application execution level or at the operating system (OS) kernel level, thereby enabling security at any level of code execution.

A user can enter commands and information into the computer 1602 through one or more wired/wireless input devices, e.g., a keyboard 1638, a touch screen 1640, and a pointing device, such as a mouse 1642. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1604 through an input device interface 1644 that can be coupled to the system bus 1608, but can be connected by other interfaces, such as a parallel port, an IEEE 1394 serial port, a game port, a USB port, an IR interface, a BLUETOOTH® interface, etc.

A monitor 1646 or other type of display device can be also connected to the system bus 1608 via an interface, such as a video adapter 1648. In addition to the monitor 1646, a computer typically includes other peripheral output devices (not shown), such as speakers, printers, etc.

The computer 1602 can operate in a networked environment using logical connections via wired and/or wireless communications to one or more remote computers, such as a remote computer(s) 1650. The remote computer(s) 1650 can be a workstation, a server computer, a router, a personal computer, portable computer, microprocessor-based entertainment appliance, a peer device or other common network node, and typically includes many or all of the elements described relative to the computer 1602, although, for purposes of brevity, only a memory/storage device 1652 is illustrated. The logical connections depicted include wired/wireless connectivity to a local area network (LAN) 1654 and/or larger networks, e.g., a wide area network (WAN) 1656. Such LAN and WAN networking environments are commonplace in offices and companies, and facilitate enterprise-wide computer networks, such as intranets, all of which can connect to a global communications network, e.g., the Internet.

When used in a LAN networking environment, the computer 1602 can be connected to the local network 1654 through a wired and/or wireless communication network interface or adapter 1658. The adapter 1658 can facilitate wired or wireless communication to the LAN 1654, which can also include a wireless access point (AP) disposed thereon for communicating with the adapter 1658 in a wireless mode.

When used in a WAN networking environment, the computer 1602 can include a modem 1660 or can be connected to a communications server on the WAN 1656 via other means for establishing communications over the WAN 1656, such as by way of the Internet. The modem 1660, which can be internal or external and a wired or wireless device, can be connected to the system bus 1608 via the input device interface 1644. In a networked environment, program modules depicted relative to the computer 1602 or portions thereof, can be stored in the remote memory/storage device 1652. It will be appreciated that the network connections shown are example and other means of establishing a communications link between the computers can be used.

When used in either a LAN or WAN networking environment, the computer 1602 can access cloud storage systems or other network-based storage systems in addition to, or in place of, external storage devices 1616 as described above, such as but not limited to a network virtual machine providing one or more aspects of storage or processing of information. Generally, a connection between the computer 1602 and a cloud storage system can be established over a LAN 1654 or WAN 1656 e.g., by the adapter 1658 or modem 1660, respectively. Upon connecting the computer 1602 to an associated cloud storage system, the external storage interface 1626 can, with the aid of the adapter 1658 and/or modem 1660, manage storage provided by the cloud storage system as it would other types of external storage. For instance, the external storage interface 1626 can be configured to provide access to cloud storage sources as if those sources were physically connected to the computer 1602.

The computer 1602 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 17:
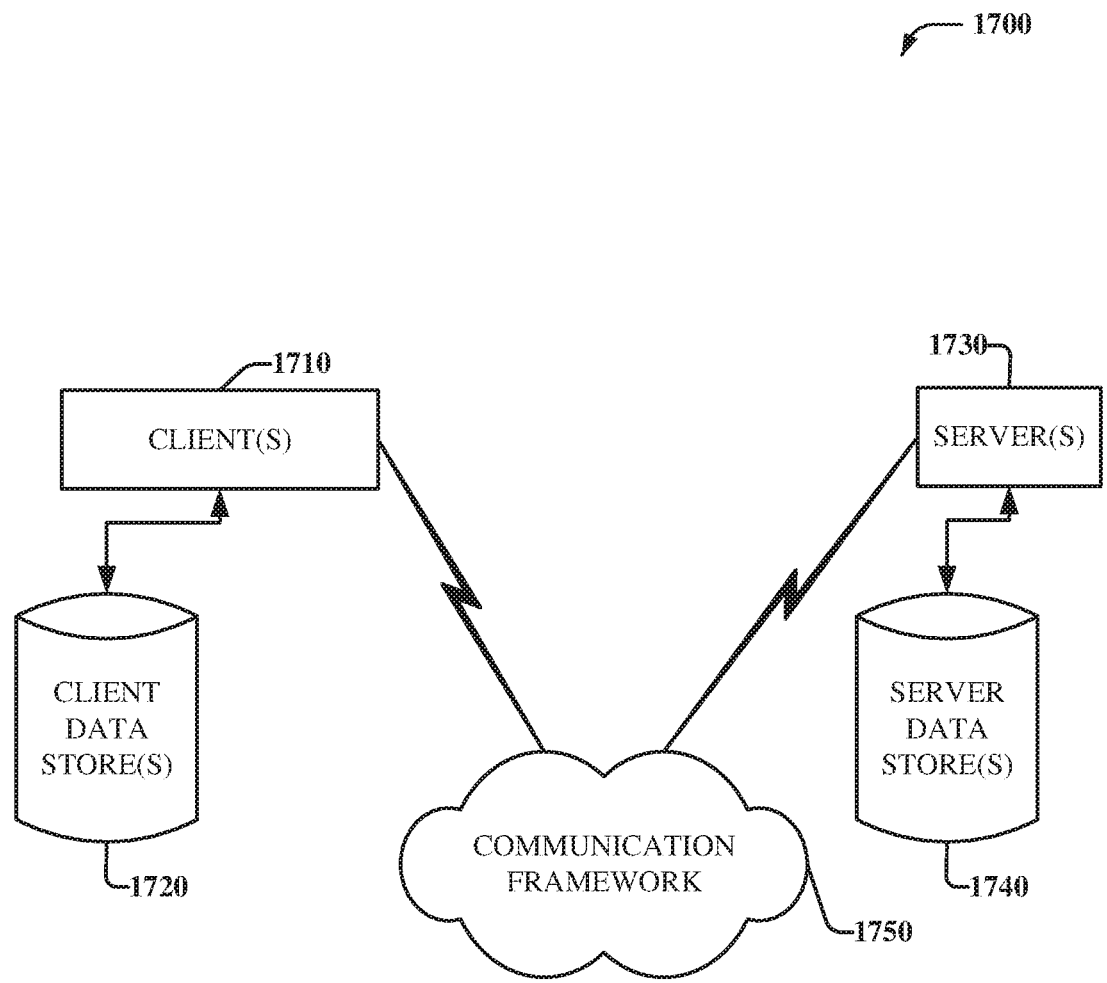
FIG. 17 illustrates an example networking environment operable to execute various implementations described herein.

FIG. 17 is a schematic block diagram of a sample computing environment 1700 with which the disclosed subject matter can interact. The sample computing environment 1700 includes one or more client(s) 1710. The client(s) 1710 can be hardware and/or software (e.g., threads, processes, computing devices). The sample computing environment 1700 also includes one or more server(s) 1730. The server(s) 1730 can also be hardware and/or software (e.g., threads, processes, computing devices). The servers 1730 can house threads to perform transformations by employing one or more embodiments as described herein, for example. One possible communication between a client 1710 and a server 1730 can be in the form of a data packet adapted to be transmitted between two or more computer processes. The sample computing environment 1700 includes a communication framework 1750 that can be employed to facilitate communications between the client(s) 1710 and the server(s) 1730. The client(s) 1710 are operably connected to one or more client data store(s) 1720 that can be employed to store information local to the client(s) 1710. Similarly, the server (s) 1730 are operably connected to one or more server data store(s) 1740 that can be employed to store information local to the servers 1730.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a central validation server that stores a plurality of request validation specifications respectively corresponding to a plurality of domain services, wherein each of the plurality of domain services is a different service provided to a client; and
a gateway service upstream of the plurality of domain services, wherein the gateway service comprises a processor and a memory having stored thereon instructions that are executable by the processor to cause the gateway service to perform operations comprising:
receive a request from the client, the request associated with an operational flow path through the plurality of domain services;
identify information required by the plurality of domain services, wherein the identification of the information comprises transmitting a validation instruction to the central validation server, the validation instruction configured to command the central validation server to transmit the plurality of request validation specifications to the gateway service, each one of the plurality of request validation specifications corresponding to one of the plurality of domain services;
determine whether to validate the request based on the identification of the information required by the plurality of domain services;
determine that the request satisfies the plurality of request validation specifications; and
invoke, based on the determination that the request satisfies the plurality of request validation specifications, the operational flow path through the plurality of domain services.

2. The system of claim 1, wherein the instructions further cause the gateway service to determine that the request fails to satisfy at least one of the plurality of request validation specifications and returns an error to the client without invoking the plurality of domain services.

3. The system of claim 2, wherein the instructions further cause the gateway service to prompt the client for a valid request.

4. The system of claim 1, where the instructions further cause the gateway service to derive the operational flow path through the plurality of domain services based on the request, and wherein the validation instruction identifies the operational flow path through the plurality of domain services.

5. The system of claim 1, wherein the instructions further cause the gateway service to a result to the client based on the operational flow path through the plurality of domain services.

6. The system of claim 1, wherein the central validation server is configured to receive updates to the plurality of request validation specifications without corresponding updates being independently pushed to the plurality of domain services.

7. The system of claim 6, wherein the instructions further cause the gateway service to periodically check the central validation server for updates to the plurality of request validation specifications.

8. A computer-implemented method, comprising:
maintaining, by a central validation server, a plurality of request validation specifications respectively corresponding to a plurality of domain services, wherein each of the plurality of domain services is a different service provided to a client;
receiving, by a first domain service upstream of the plurality of domain services, a request from a gateway service upstream of the first domain service or from another domain service upstream of the first domain service, the request handleable by an operational flow path through the plurality of domain services;
identifying, by the first domain service, information required by the plurality of domain services, wherein the identifying includes transmitting, by the first domain service, a validation instruction to the central validation server, the validation instruction commanding the central validation server to transmit the plurality of request validation specifications to the first domain service, each one of the plurality of request validation specifications corresponding to one of the plurality of domain services;
determining, by the first domain service, whether to validate the request based on the identified information required by the plurality of domain services;
determining, by the first domain service, that the request satisfies the plurality of request validation specifications; and
invoking, by the first domain service based on the determination that the request satisfies the plurality of request validation specifications, the operational flow path through the plurality of domain services.

9. The computer-implemented method of claim 8, further comprising:
determining, by the first domain service, that the request fails to satisfy at least one of the plurality of request validation specifications; and
generating, by the first domain service, an error without invoking the plurality of domain services.

10. The computer-implemented method of claim 9, further comprising:
prompting, by the first domain service, the gateway service or the another domain service for a valid request.

11. The computer-implemented method of claim 8, further comprising:
deriving, by the first domain service, the operational flow path through the plurality of domain services, wherein the validation instruction identifies the operational flow path through the plurality of domain services.

12. The computer-implemented method of claim 8, further comprising:
returning, by the first domain service, a result to the gateway service or to the another domain service.

13. The computer-implemented method of claim 8, further comprising:
receiving, by the central validation server, updates to the plurality of request validation specifications without independently pushing corresponding updates to the plurality of domain services.

14. The computer-implemented method of claim 13, further comprising:
periodically checking, by the first domain service, the central validation server for updates to the plurality of request validation specifications.

15. A computer program product for facilitating centralized request validation, the computer program product comprising a computer readable memory having program instructions embodied therewith, the program instructions executable by a processor to cause the processor to:
store, by a central validation server, multiple validation specifications corresponding to multiple computing services, wherein each of the multiple computing services is a different service provided to a client;
receive, by a first computing service upstream of the multiple computing services, a request, the request resolvable via invocation of an operational flow path through the multiple computing services;
transmit, by the first computing service, an instruction to the central validation server, the instruction commanding the central validation server to validate the request;
identify, by the central validation server, information required by the multiple computing services based on the multiple validation specifications, each one of the multiple validation specifications corresponding to one of the multiple computing services;
determine, by the central validation server, whether to validate the request based on the identified information required by the multiple computing services; and
determine, by the central validation server, that the request satisfies the multiple validation specifications; and
invoke, by the central validation server based on the determination that the request satisfies the multiple validation specifications, the operational flow path through the multiple computing services.

16. The computer program product of claim 15, wherein the first computing service is a gateway service or a domain service.

17. The computer program product of claim 15, wherein the program instructions are further executable to cause the processor to:
determine, by the central validation server, that the request fails to satisfy at least one of the multiple validation specifications;
transmit, by the central validation server, an unsuccessful validation message to the first computing service; and
relay, by the first computing service, the unsuccessful validation message in response to the request without invoking the multiple computing services.

18. The computer program product of claim 17, wherein the program instructions are further executable to cause the processor to:
identify, by the central validation server, the operational flow path through the multiple computing services based on the instruction.

19. The computer program product of claim 15, wherein the program instructions are further executable to cause the processor to:
transmit, by the central validation server, a successful validation message to the first computing service.

20. The computer program product of claim 15, wherein the program instructions are further executable to cause the processor to:

receive, by the central validation server, updates to the multiple validation specifications without independently pushing corresponding updates to the multiple computing services.

21. The system of claim 1, wherein the gateway service communicates with each one of the plurality of domain services through a different application programming interface (API) associated with a respective one of the plurality of domain services.

22. The system of claim 1, wherein gateway service receives the request from the client through an application programming interface (API) associated with the gateway service.

23. The system of claim 1, wherein each of the identification of the information required by the plurality of domain services and the determination whether to validate the request based on the identification of the information occurs prior to the gateway service communicating with the plurality of domain services regarding the request.

\* \* \* \* \*